United States Patent
Wang et al.

(10) Patent No.: US 10,679,269 B2
(45) Date of Patent: Jun. 9, 2020

(54) ITEM SELLING ON MULTIPLE WEB SITES

(71) Applicant: Pinterest, Inc., San Francisco, CA (US)

(72) Inventors: Chao Wang, San Francisco, CA (US); Michael Yamartino, San Francisco, CA (US); Sridatta Kaustubh Thatipamala, San Francisco, CA (US); Yuan Wei, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 715 days.

(21) Appl. No.: 14/964,307

(22) Filed: Dec. 9, 2015

(65) Prior Publication Data

US 2016/0335688 A1   Nov. 17, 2016

Related U.S. Application Data

(63) Continuation-in-part of application No. 14/726,929, filed on Jun. 1, 2015, now Pat. No. 10,269,055.

(60) Provisional application No. 62/160,456, filed on May 12, 2015.

(51) Int. Cl.
   *G06Q 30/00* (2012.01)
   *G06Q 30/06* (2012.01)
(52) U.S. Cl.
   CPC ..... *G06Q 30/0617* (2013.01); *G06Q 30/0643* (2013.01)
(58) Field of Classification Search
   CPC ............... G06Q 30/00; G06Q 30/0601; G06Q 30/0633; G06Q 30/0641
   See application file for complete search history.

(56) References Cited

U.S. PATENT DOCUMENTS

| | | |
|---|---|---|
| 5,579,471 A | 11/1996 | Barber et al. |
| 5,596,690 A | 1/1997 | Stone et al. |
| 6,446,081 B1 | 9/2002 | Preston |
| (Continued) | | |

FOREIGN PATENT DOCUMENTS

| | | |
|---|---|---|
| CA | 2495046 A1 | 2/2004 |
| JP | 2010250426 A1 | 11/2010 |
| (Continued) | | |

OTHER PUBLICATIONS

Kusumah, Ryan. "Analyze the effect of trust, price, quality and perceived risk toward consumer purchase behavior in online shops Instagram." Jurnal Berkala Ilnniah Efisiensi 15.5 (2015). (Year: 2015).*

(Continued)

*Primary Examiner* — Christopher B Seibert
(74) *Attorney, Agent, or Firm* — Athorus, PLLC

(57) ABSTRACT

The described implementations enable a seller to sell items through multiple e-commerce channels without having to maintain independent merchant accounts at each channel. For example, a seller may sell items directly and through a management service. When a user request to purchase an item from the seller through the management service is received, the management service sends the purchase information to the seller so that the seller can complete the purchase as if the purchase were being made directly with the seller. Upon completion of the purchase, the seller provides a confirmation back to the management service and provides the item directly to the user.

20 Claims, 17 Drawing Sheets

(56) References Cited

U.S. PATENT DOCUMENTS

| | | | |
|---|---|---|---|
| 6,731,788 B1* | 5/2004 | Agnihotri | G06K 9/3266 |
| | | | 382/157 |
| 7,117,519 B1 | 10/2006 | Anderson et al. | |
| 8,429,168 B1 | 4/2013 | Chechik et al. | |
| 8,458,053 B1* | 6/2013 | Buron | G06Q 30/06 |
| | | | 705/14.4 |
| 8,548,872 B1* | 10/2013 | Gupta | G06Q 30/0206 |
| | | | 705/26.1 |
| 8,660,912 B1* | 2/2014 | Dandekar | G06Q 30/06 |
| | | | 705/26.1 |
| 8,719,104 B1 | 5/2014 | Endresen | |
| 8,909,563 B1 | 12/2014 | Jing et al. | |
| 9,098,741 B1 | 8/2015 | Anguelov et al. | |
| 2004/0013286 A1 | 1/2004 | Viola et al. | |
| 2005/0031165 A1 | 2/2005 | Olson et al. | |
| 2005/0225678 A1 | 10/2005 | Zisserman et al. | |
| 2006/0018521 A1 | 1/2006 | Avidan | |
| 2006/0041485 A1* | 2/2006 | Tarvydas | G06Q 30/06 |
| | | | 705/26.62 |
| 2006/0112092 A1 | 5/2006 | Ziou et al. | |
| 2006/0251292 A1 | 11/2006 | Gokturk et al. | |
| 2007/0050406 A1* | 3/2007 | Byers | G06F 16/48 |
| 2007/0071323 A1 | 3/2007 | Kontsevich et al. | |
| 2007/0177805 A1 | 8/2007 | Gallagher | |
| 2007/0286531 A1 | 12/2007 | Fu et al. | |
| 2007/0294240 A1* | 12/2007 | Steele | G06F 16/38 |
| 2008/0167946 A1* | 7/2008 | Bezos | G06Q 20/0855 |
| | | | 705/14.16 |
| 2009/0037291 A1* | 2/2009 | Dawson | G06Q 30/02 |
| | | | 705/27.2 |
| 2009/0304267 A1 | 12/2009 | Tapley et al. | |
| 2010/0076867 A1 | 3/2010 | Inoue et al. | |
| 2010/0082597 A1 | 4/2010 | Retterath et al. | |
| 2010/0106732 A1 | 4/2010 | Atallah et al. | |
| 2010/0114654 A1* | 5/2010 | Lukose | G06Q 30/00 |
| | | | 705/14.54 |
| 2010/0205142 A1 | 8/2010 | Feulner et al. | |
| 2010/0226564 A1 | 9/2010 | Marchesotti et al. | |
| 2011/0081090 A1 | 4/2011 | Bouguet et al. | |
| 2011/0194761 A1 | 8/2011 | Wang et al. | |
| 2011/0268323 A1 | 11/2011 | Gallagher | |
| 2011/0320317 A1* | 12/2011 | Yuan | G06Q 30/0601 |
| | | | 705/26.61 |
| 2012/0123976 A1 | 5/2012 | Wang et al. | |
| 2012/0143856 A1 | 6/2012 | Klinkigt et al. | |
| 2012/0194681 A1 | 8/2012 | Atsmon et al. | |
| 2012/0233020 A1* | 9/2012 | Eberstadt | G06Q 10/10 |
| | | | 705/26.41 |
| 2012/0294520 A1 | 11/2012 | Mei et al. | |
| 2013/0007620 A1 | 1/2013 | Barsook et al. | |
| 2013/0013427 A1* | 1/2013 | Gonsalves | G06Q 30/02 |
| | | | 705/14.73 |
| 2013/0132236 A1 | 5/2013 | Gokturk et al. | |
| 2013/0188886 A1 | 7/2013 | Petrou | |
| 2013/0251273 A1 | 9/2013 | Westphal | |
| 2013/0282712 A1 | 10/2013 | Brandt | |
| 2014/0136990 A1* | 5/2014 | Gonnen | H04L 51/18 |
| | | | 715/752 |
| 2014/0297537 A1* | 10/2014 | Kassemi | G06Q 20/02 |
| | | | 705/67 |
| 2015/0052061 A1* | 2/2015 | Anderson | G06Q 20/409 |
| | | | 705/71 |
| 2015/0088686 A1* | 3/2015 | Glassberg | G06Q 30/0641 |
| | | | 705/26.8 |
| 2015/0134688 A1* | 5/2015 | Jing | G06F 16/5866 |
| | | | 707/766 |
| 2015/0178317 A1 | 6/2015 | Spielberg | |
| 2015/0248429 A1 | 9/2015 | Pregueiro et al. | |
| 2015/0317698 A1* | 11/2015 | Kalyvas | G06Q 30/0277 |
| | | | 705/14.16 |
| 2016/0005171 A1 | 1/2016 | Watanabe et al. | |

FOREIGN PATENT DOCUMENTS

| | | |
|---|---|---|
| JP | 2013167973 A | 8/2013 |
| JP | 2014044481 A | 3/2014 |
| JP | 2014225275 A | 12/2014 |
| WO | 2009155604 A2 | 12/2009 |

OTHER PUBLICATIONS

Extended European Search Report for EP Application No. 14863014.8 dated Mar. 30, 2017.
International Search Report and Written Opinion for PCT Application No. PCT/US2016/031914 dated Aug. 16, 2016.
International Search Report and Written Opinion for PCT Application No. PCT/US2016/055212 dated Dec. 23, 2016.
International Search Report for PCT Application No. PCT/US2014/064871, dated Feb. 6, 2015.
Extended European Search Report EP Application No. 16793471.0 dated Aug. 23, 2018, 6 pages.
Ram, " Try Google Image Search With Your Product Image," Dec. 16, 2014, around.io, p. 1. (Year: 2014).

* cited by examiner

ITEM SELLING ON MULTIPLE WEB SITES

CROSS-REFERENCE TO RELATED APPLICATIONS

This application is a continuation-in-part of U.S. patent application Ser. No. 14/726,929, filed Jun. 1, 2015, entitled "Matching User Provided Representations Of Items With Sellers Of Those Items," and claims the benefit of U.S. Provisional Application No. 62/160,456, filed May 12, 2015 entitled "Matching User Provided Representations Of Items With Sellers Of Those Items," both of which are incorporated herein by reference in their entirety.

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Sellers in the e-commerce market typically establish a website that may be visited by users to browse various web pages within the website that include product information relating to products offered for sale by the seller. A user may typically obtain product details, product reviews posted by other users, and/or purchase the item from the seller of the product. Upon purchase of the product, the seller will package and ship the item to a user specified delivery destination.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
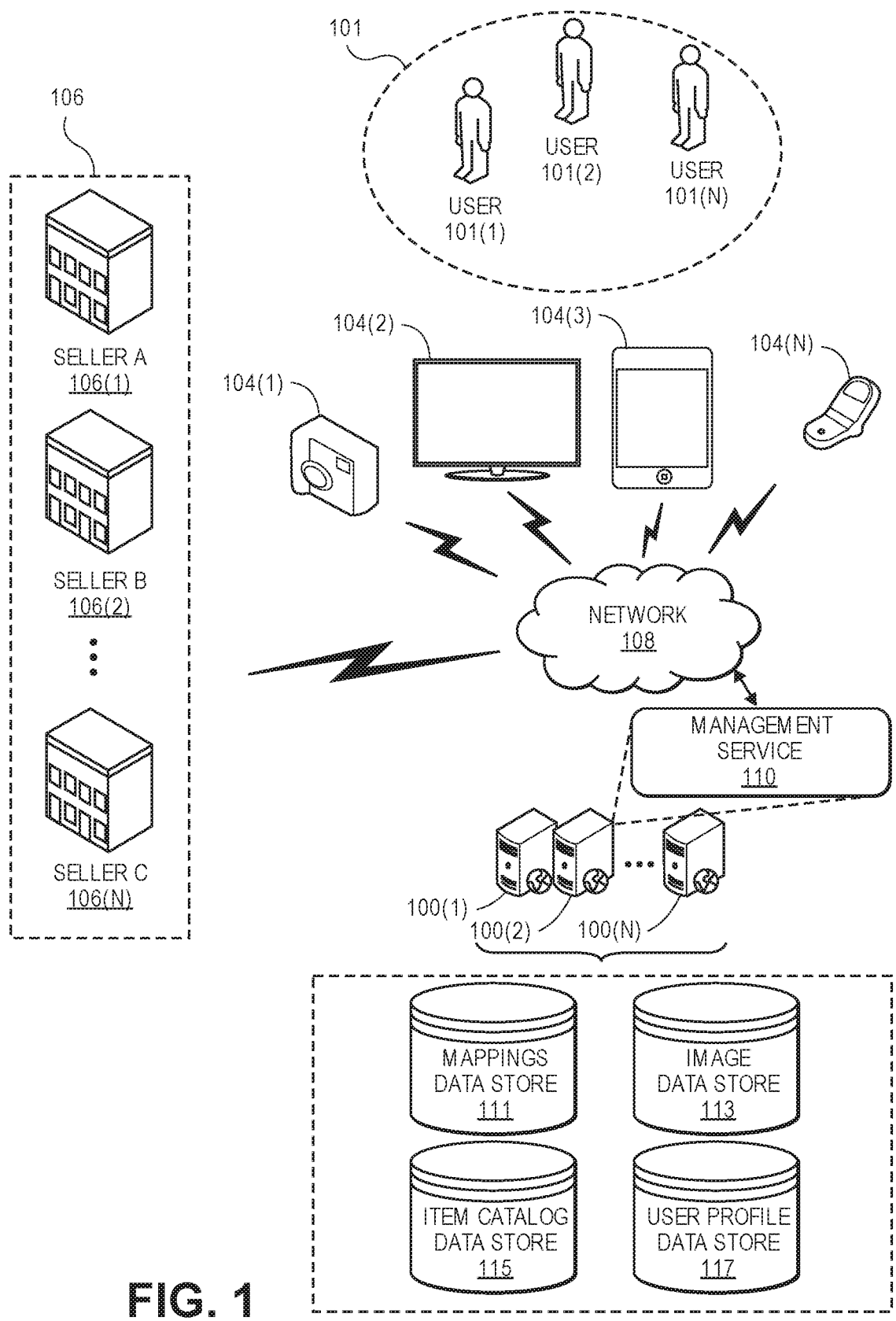
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and methods for enabling sellers to sell items directly and also sell those items as a merchant through a management service without having to maintain separate inventory and/or purchase processing information with the management service.

Currently, many e-commerce sellers advertise and sell items through their own website or application, which may be hosted by the seller or running on an e-commerce "shopping cart" platform (e.g., MAGENTO, SHOPIFY, BIGCOMMERECE). To enable purchases of items by users, the seller has a shopping cart and coordinates with a payment processor (e.g., AUTHORIZE.NET, PAYPAL, STRIPE, BALANCED) that actually processes the payment for items so that funds are transferred from the user to the seller.

With the rapid growth of e-commerce, sellers often find it necessary to increase their exposure to potential customers by, for example, participating as a merchant on a third party website or application that is maintained by a management service, and offering their items for sale through that management service. Merchants are typically required to pay to the management service a percentage or commission for each sale, and/or a recurring fee to have the privilege to offer items for sale through that management service. Likewise, the merchant must maintain a merchant account with the management service where they manually update inventory counts for items, post items for sale, adjust prices, manage shipping and order fulfillment, etc. While such an independent merchant account provides insight to the management service, it requires additional effort by the seller and presents problems with inventory management and order fulfillment, to name a few.

For example, if a seller has 5 units of item A that they intend to sell, the sellers must either allocate separate inventory quantities for each different selling channel (e.g., 3 units for their own direct sales and 2 units for the management service sales) or they must update the quantity available each time an item is ordered. For example, if the seller lists 5 available units on their own website and 5 available units through the management service, the seller will need to access the merchant account and update the quantity available through the management service each time a unit is sold directly by the seller. Likewise, each time a unit is sold through the management service, the seller will have to access their own website and update the quantity available.

Likewise, because the management service and the seller are independent, the host requires that order processing, payment, and order management be performed directly with the management service. As such, the seller may be required to coordinate with a first payment authorization entity for the seller and a second payment authorization entity for the merchant account with the management service. These duplicate efforts create additional work for the seller and potential for executing an order with a user in which the seller does not have any units on-hand—a bad customer experience.

As discussed further below, the described implementations enable a seller to offer items for sale directly and as a merchant through a management service without having to maintain separate inventory, manually update information with the management service, and/or manage orders from the management service. Each transaction made with the management service is sent to the seller for processing and completion, as if the user had purchased the item directly from the seller.

For example, a seller may create a merchant account with a management service such that the management service and the seller are authorized to exchange information. The seller sends to the management service an item catalog that identifies items offered for sale by the seller that may be purchased by users from the seller. The item catalog may identify, for each item, the item, a source location identifier, such as Uniform Resource Locator ("URL") of a web page from which the item may be viewed and/or purchased from the seller, an image of the item, item information, image information, etc.

The management service may be a service where users can post images, view images, share images, correspond with other users, purchase items, etc. The management service may use the information from the item catalog provided by the seller to determine if any of the images accessible by users of the management service include representations of items offered for sale by the seller. For example, in some instances, users of the management service may post an image to the management service that was obtained from another web page, such as a web page of the seller's website. In such an instance, the posted image may include image information, also known as metadata, which includes the URL from which the image was obtained. If the URL of the image provided by the user corresponds with a URL included in the item catalog, it may be determined that the image provided by the user to the management service includes a representation of an item available for purchase from the seller and the user provided image is associated with the item and/or the seller of the item.

In another example, if the image provided by the user does not include a URL, or the URL included in the image information does not correspond with a URL from the item catalog, the image may be processed using one or more image processing algorithms to detect an item represented in the image. The processed image may then be compared with images and/or image information included in the item catalog provided by the seller to determine if an item offered for sale by the seller is represented in the image. If it is determined that an item offered for sale by the seller is represented in the image provided by the user, the user provided image is associated with the item and/or the seller of the item.

When the user, or another user of the management service, requests to view the user provided image that has been determined to include a representation of an item offered for sale by the seller, a purchase control is presented with the user provided image. In addition, seller information that identifies the seller and/or the item may likewise be presented with the presentation of the user provided image. The purchase control is selectable by the user viewing the image to obtain variant information about the item represented in the image and/or to purchase the item represented in the image from the seller. Item "variant information," as used herein, is additional information about the item and/or the sale of the item. For example, item variant information may include the quantity of the item available for sale by the seller, the price of the item, a size of the item, a color of the item, a shipping cost for shipping the item, a shipping time, and/or other information.

If a user requests to purchase an item represented in a user provided image from a seller that has been determined to offer the represented item for sale, the management service facilitates the purchase between the user and the seller. For example, the management service may send an item reservation request to the seller to reserve one or more units of the item that may be purchased by the user viewing the item. If the user selects to purchase the item, rather than requiring the merchant to maintain a payment authorization service with the merchant account, the purchase information is provided from the management service to the seller. In some implementations, encrypted credit card information may be sent to the seller as part of the item information. In other implementations, the credit card associated with the user may be represented as a unique token managed by a vault service. The vault service maintains, in a secure form, credit card information. The vault provider replaces the token with the credit card and provides the purchase information to the seller for authorization. The seller, upon authorizing the purchase, sends an authorization confirmation to the management service and the management service notifies the user that the purchase of the item from the seller has been completed.

By providing the purchase information to the seller, and allowing the seller to coordinate with their payment processor for purchase authorization, the seller need only maintain a single relationship with a payment processor, can manage all inventory at a single location, and need not independently update different merchant accounts.

In another example, in response to a purchase request, the management service may provide an item identifier, item information (e.g., selected variants), user identifier, etc. In some implementations, the management service may likewise facilitate payment by the user for the item, such as through a third party payment processor. Alternatively, payment information may be provided to the seller for processing of payment for the item. Finally, purchase of the item is completed and the seller may ship the item to the user.

An "item" may be anything that can be represented and offered for sale. For example, an item may be a physical good (clothing, hardware, paintings, etc.), a digital item (e.g., audio, video, image), a service (e.g., landscaping, banking, house painting).

FIG. 1 is a pictorial diagram of an illustrative environment that includes users 101, such as users 101(1), 101(2)-101(N), a server system 100 that includes one or more server computers 100(1), 100(2)-100(N), one or more client devices 104, such as client device 104(1), 104(2), 104(3)-104(N), and one or more sellers 106, such as a Seller A 106(1), Seller B 106(2)-Seller C 106(N) communicatively connected via a network 108. As will be appreciated, any number and/or type of server systems 100, client devices 104 and/or sellers 106 may be included in the environment, and those illustrated in FIG. 1 are only exemplary. Likewise, any number of users 101 may be included in the environment. For purposes of this discussion, the term "user" will be used herein to refer to an individual interacting with the management service 110 (discussed below) to post or otherwise provide images, view images, share images, correspond with other users, purchase items represented in viewed images, etc.

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 100 may also include a mappings data store 111, an image data store 113, an item catalog data store 115, and/or a user profile data store 117. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 111, image data store 113, item catalog data store 115, and user profile data store 117 may be integrated with the server system 100 or otherwise communicatively coupled with the server system 100. For example, one or more of the mappings data store 111, image data store 113, item catalog data store 115, and/or user profile data store 117 may be located at a remote computing resource (not shown) and communicatively coupled with the server system 100. In some implementations, the mappings data store 111, image data store 113, item catalog data store 115, and/or user profile data store 117 may include one or more CD-RW/DVD-RW drives, hard disk drives, tape drives, or other storage devices that are utilized to store digital content and information. The server system 100, separately or together with the mappings data store 111, image data store 113, item catalog data store 115, and/or user profile data store 117, may provide a management service 110 that facilitates user 101 postings of images, viewing of images, sharing of images, corresponding with other users, viewing of item variant information for items represented in images, and the like. Likewise, the management service 110 may facilitate the purchase by a user of an item represented in an image from a determined seller of the item.

The server system 100 may also be configured to exchange information with one or more sellers 106. The sellers 106 may include any type of entity and/or individual(s) that offers items for sale. For example, sellers 106 may include e-commerce websites that sells and delivers items, a service offering, a traditional retail or wholesale store, etc.

In some implementations, the sellers 106 may interact with the management service 110 and provide and/or update an item catalog listing items offered for sale by the seller. The item catalog may include item information about each item offered for sale by the seller. For example, the item information may include a name of the item, a price of the item, a URL for the seller's web page from which the item may be viewed and/or purchased from the seller, a geographic location of the seller, an advertising amount the seller is willing to pay to advertise the item and/or have a user provided image associated with the item, etc. For example, a seller may offer for sale thousands of items via their own e-commerce website and each of those items may be associated with or represented on one or more web pages of the seller's website. The seller 106 may provide to the management service 110 an item catalog listing one, some, or all of the items that the seller offers for sale. As discussed further below, the management service 110 may store the seller provided item catalog in the item catalog data store 115 and determine if any of the user provided images maintained in the image data store 113 include a representation of an item listed in the item catalog provided by the seller. Images maintained in the image data store 113 that include a representation of an item identified by the seller in the item catalog are associated with the item and/or the seller. The association is maintained in the mappings data store 111.

The advertising amount may identify an amount the seller is willing to pay to promote the item, to have the item associated with user provided images that include representations of the item, and the like. In some implementations, the advertising amount may be based on the number of views or impressions the item receives by users of the management service. In other implementations, the advertising amount may be for a defined period of time, etc. In implementations when more than one seller offers a same or similar item for sale, the advertising amount may be utilized as a factor in determining which seller(s) is associated with a user provided image that includes a representation of the item.

Sellers 106 may also periodically update the provided item catalog by identifying additional items that the seller offers for sale, removing items from the item catalog, by providing updated variant information for items identified in the item catalog and/or by altering the advertising amount for the item. Those updates are reflected in the item catalog data store 115 and may be used by the management service 110 when presenting images to users.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 100 is configured to exchange data and information, including information about users, images, sellers, items, item variants, and other like information with client devices 104. For example, the management service 110 may interact via the server system 100 to present images to a user 101, present item variant information to a user 101, facilitate purchase of an item between a user and a seller of the item, and the like.

Likewise, a user 101 may interact with the management service 110, via a client device 104, to provide images, view images, share images, correspond with other users, initiate a purchase of an item from a seller of the item, etc. As described herein, a user that provides an image that includes a representation of an item may be a different person or entity than the seller of the item represented in the image.

The mappings data store 111 stores information about the associations between items represented in user provided images and items offered for sale by sellers. For example, an item may be determined to be represented in a user provided image that is available for sale (listed in an item catalog) from three different sellers. In such an example, the mappings data store 111 will maintain an association between the user provided image, which is maintained in the image data store 113, and the corresponding item listed in each of the seller's provided item catalogs.

The user profile data store 117 stores information about users 101 of the management service 110. Any type of information may be stored in the user profile data store 117. For example, user profile information, such as attributes, name, address, gender, browse history, purchase history, billing information, shipping information, purchasing information, social networks and/or friends with which the user 101 interacts, and the like, may be stored in the user profile data store 117. User profile information may be provided directly by users 101 and/or collected from users 101 of the client devices 104 when interacting with the management service 110 (e.g., clickstream data as the user explores the management service 110), when posting, viewing, and/or sharing images, when facilitating a purchase between the user and a seller, etc. In some implementations, users of the management service 110 may choose to limit the amount of information included in their user profile, to limit access to their user profile information and/or to limit what information is shared, if any, from their user profile information. The user profile information maintained in the user profile data store 117 may be used by the management service 110 to facilitate a purchase of an item by a user from a seller.

In addition to maintaining information about mappings, item catalogs, images, and users, the management service 110 may provide use information back to the users 101 and/or the sellers 106. For example, the management service 110, through communication between the server system 100 and a client device 104, may provide use and/or purchase information (e.g., purchase history) back to a user 101. Such information may include an identification of images recently viewed, provided or shared, an identification of others that have viewed images posted by the user, purchases of items made by the user, and the like. Likewise, the management service 110, through communication between the server system 100 and the sellers 106, may provide information to the sellers 106. Such information may include analytics about items offered for sale by the seller, such as how many user provided images include a representation of each item, purchase history for items, etc.

Figure 2:
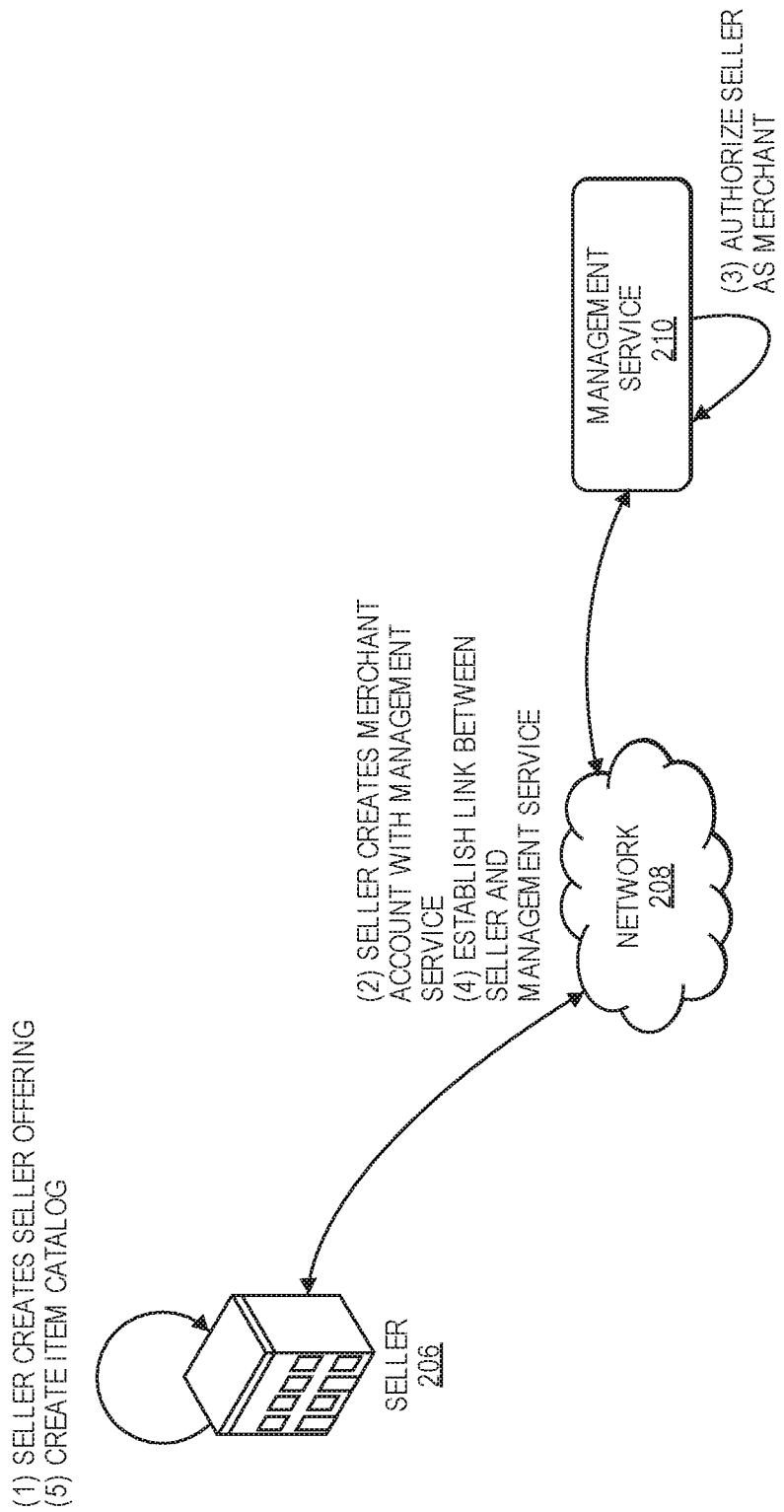
FIG. 2 is a block diagram of an example implementation for listing items for sale by a seller on multiple websites, according to an implementation.

FIG. 2 is a block diagram of an example implementation for listing items for sale by a seller through multiple channels, according to an implementation. The example implementation begins with a seller 206 creating a seller offering for items in which users can purchase items available for sale directly from the seller. For example, the seller may create their own e-commerce website, may create a website that is hosted by an E-commerce platform provider, such as SHOPIFY, MAGENTO, BIGCOMMERCE, VOLUSION, BIGCARTEL, 3DCART, etc. To enable purchase of items, the seller is associated with a payment processor, such as AUTHORIZE.NET, STRIPE, PAYPAL, BALANCED, that processes and authorizes purchase requests from users.

In addition to establishing a direct seller offering, the seller 206 creates an account, referred to herein as a merchant account, with the management service 210. The merchant account enables the management service 210 and the seller 206 to share information. In one example, the seller 206 creates a merchant account and is presented with a dialog requesting that the management service 210 be authorized to share information with the seller. Upon receiving authorization, the management service 210 sends a token via the network 208 to the seller and requests seller information from the seller so that the seller and the management service 210 can establish a communication link and exchange information over the network 208. The token may be used by the seller 206 to identify information sent by the management service 210 as being associated with the seller 206. In response, the seller sends the seller information to the management service 210 and the management service 210 uses that seller information to identify information received from the seller as associated with the seller 206 and to authorize the seller 206 to sell items through the management service. For example, seller information needed to authorize the seller 206 may include, but is not limited to, transaction history information, chargeback ratio, duration the seller has been selling items, seller contact information, etc.

Upon approval of the seller 206 by the management service 210, a link is established between the seller and the management service such that the seller can send information to the management service 210 and the management service 210 can send information to the seller. In addition, an item catalog is created by the seller 206. The item catalog identifies each item that the seller 206 desires to sell through the host site that is maintained by the management service 210. For each item, the item catalog may identify the item, a source location identifier, such as Uniform Resource Locator ("URL") of a web page of the seller's website from which the item may be viewed and/or purchased from the seller, an image of the item, item information, image information, a quantity available for sale, a price, shipping information, a description of the item, item category information, item size, item shape, item color, etc.

As discussed below, the item catalog, and/or portions thereof may be periodically updated by the seller so that the management service has current information regarding the items that the seller is offering for sale through the management service. For example, if a unit of an item is sold directly by the seller, the item catalog may be automatically updated so that the units available for sale through the management service is accurate. This may be done without any involvement from the seller.

Figure 3:
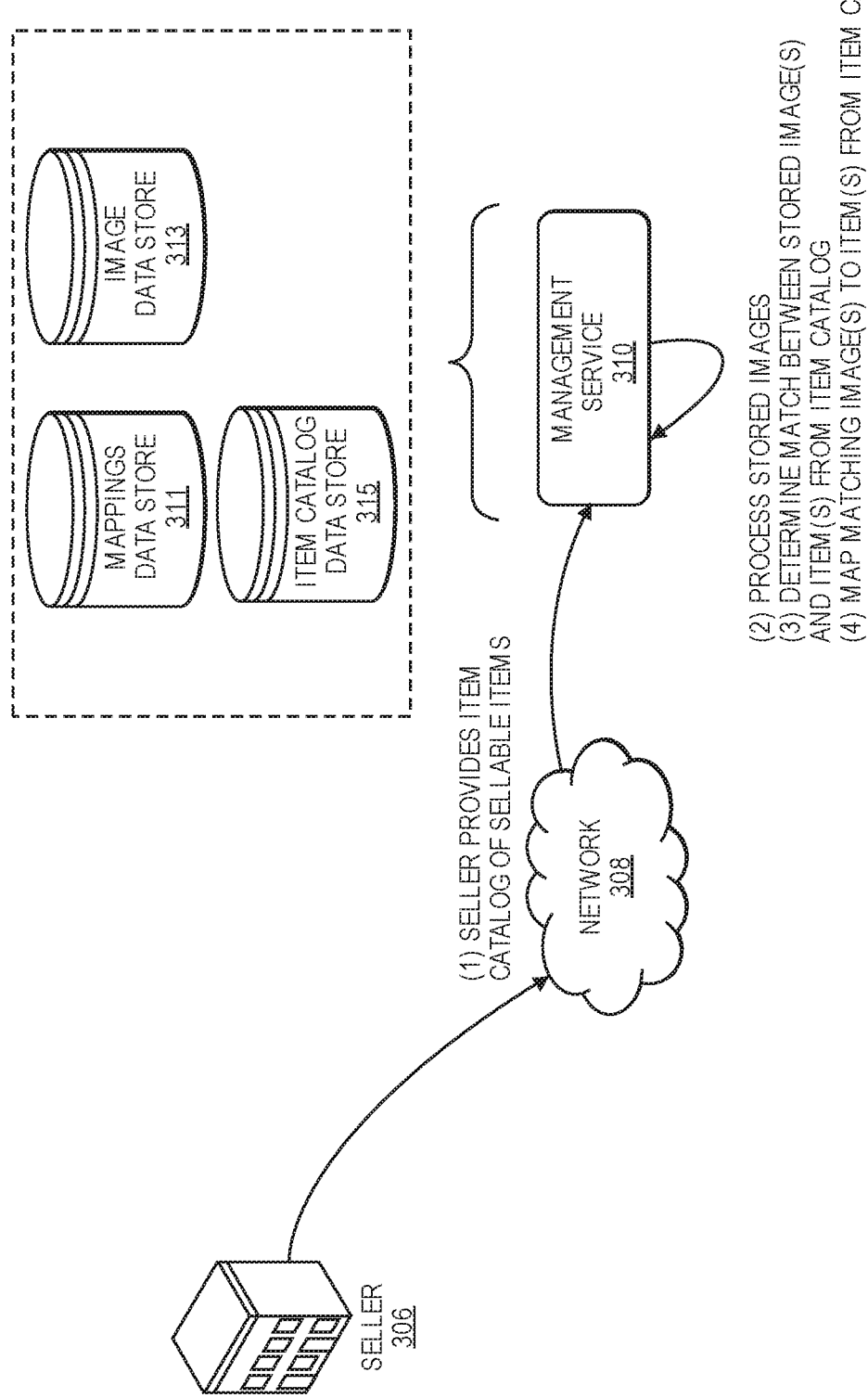
FIGS. 3-4 are block diagrams of an example implementation for matching a seller of an item with a user provided representation of the item, according to an implementation.

Referring now to FIG. 3, the seller 306 provides the item catalog to the management service 310. The item catalog is delivered over the network 308 to the management service 310 and the management service 310 stores the item catalog in an item catalog data store 315. The management service 310, upon receiving an item catalog from the seller 306, processes user provided images that are stored in the image data store 313, referred to as stored images, to determine if any of the stored images include a representation of an item identified in the item catalog as an item offered for sale by the seller.

Processing of the stored images may be incrementally performed. For example, an initial processing may include comparing a source location identifier, such as a URL, listed in the item catalog for an item, with a source location identifier included in the image information of the stored images to determine if any of the source location identifiers are the same or similar. For example, if the source location identifiers are URLs, it may be determined that a source location identifier of an existing image is the same as a source location identifier listed in the item catalog if the two URLs are the same. Likewise, it may be determined that a source location identifier of a stored image is similar to a source location identifier listed in the item catalog if the two URLs have a same domain address (are from the same website or domain).

If the source location identifiers are the same, it may be determined that the stored image includes a representation of an item offered for sale by the seller. If the stored image includes a source location identifier that is similar to that of a source location identifier included in the item catalog, the stored image may also be processed using one or more image processing algorithms to determine if the stored image is similar to the image or image information included in the item catalog that corresponds with the similar source location identifier. For example, a hash value may be determined for the stored image and compared to a hash value included in the item catalog. Alternatively, one or more image processing algorithms, such as an edge detection algorithm, object detection algorithm, etc., may be utilized to determine features of the stored image, which may be represented as feature vectors. Images provided with the item catalog may likewise be processed to generate feature vectors (or feature vectors may be provided with the item catalog). The feature vectors of a stored image may then be compared with feature vectors for the item(s) identified in the item catalog with the similar source location identifier and, if the feature vectors are similar, it may be determined that the stored image includes a representation of an item offered for sale by the seller. In some implementations, the additional processing of the images may likewise be performed for images with a same source location identifier.

A source location identifier may be any location, physical or virtual, that is associated with an item and/or any other identifier that can be used to identify the item. For example, as discussed above, a source location identifier may be a URL of a webpage at which information relating to the item may be obtained. In another implementation, the source location identifier may include physical coordinates of one or more physical locations (e.g., physical stores of the seller) where the item may be viewed and/or purchased. In such an implementation, a user provided image may include location information, such as global positioning system (GPS) coordinates, that are compared with the coordinates included in the item catalog. In still other implementations, the source location identifier may include a universal product code (UPC), barcode, bokode, etc. that is associated with the item.

In some implementations, stored images that are not matched to an item of the item catalog as part of the initial processing may be further processed. For example, using the feature vectors for the processed stored image, it may be determined if an item is represented in the image and, if so, a category for the item may be determined. For example, the management service may maintain a list of item categories and corresponding feature vectors that are representative of items associated with the item category. Item categories may be any type of classification or categorization of items. For example, item categories may include shoes, shirts, bags, sporting equipment, clothing, hats, cars, etc. For each item category, feature vectors, colors, shapes, and/or other characteristics of items associated with that category are maintained and may be used to compare with feature vectors and/or other information of the stored image. If there is a similarity between the feature vectors and/or other information associated with the item category and the feature vectors and/or other information of the stored image, the stored image may be associated with that item category.

Likewise, the seller and/or items identified in the item catalog as offered for sale by the seller may also be associated with an item category. Associating items identified by a seller as associated with a category may be done in a similar manner to that discussed above with respect to associating a stored image with a category. Alternatively, or in addition thereto, the seller may identify the category for the item, for example, by identifying an item category for each item listed in the item catalog.

Based on the category determined for the stored image and the categories associated with the sellers 306 and/or items offered for sale by sellers, it is determined whether the stored image potentially includes a representation of an item listed in the provided item catalog. For example, if the item category determined for the stored image corresponds to an item category associated with the seller and/or the item catalog provided by the seller, it may be determined that the stored image potentially includes a representation of an item offered for sale by the seller. If the stored image does include a representation of an item that may be listed in the item catalog, additional processing may be performed to determine the item represented in the image. The additional processing may include additional analysis of the stored image and/or comparison of the feature vectors and/or other image information between the stored image and items of the item catalog associated with the same item category. In another example, the stored image may be manually reviewed by a human and compared to items listed in the item catalog having the same item category to determine if the item represented in the image corresponds to an item listed in the item catalog. The human may be an employee of the management service 310, an independent reviewer, a user (or group of users) of the management service 310, a representative or employee of the seller 306, etc.

If it is determined that a stored image includes a representation of an item listed in the item catalog provided by a seller 306, the management service establishes an association between the item listed in the item catalog and the stored image and stores the association in the mappings data store 311. Likewise, the management service may establish an association between the stored image and the seller 306 and maintain that association in the mappings data store 311. As discussed further below, when a user requests to view a stored image, the management service 310 determines the association between the stored image and the item offered for sale by the seller and presents seller information and/or a purchase control with the presentation of the image of the item.

Figure 4:
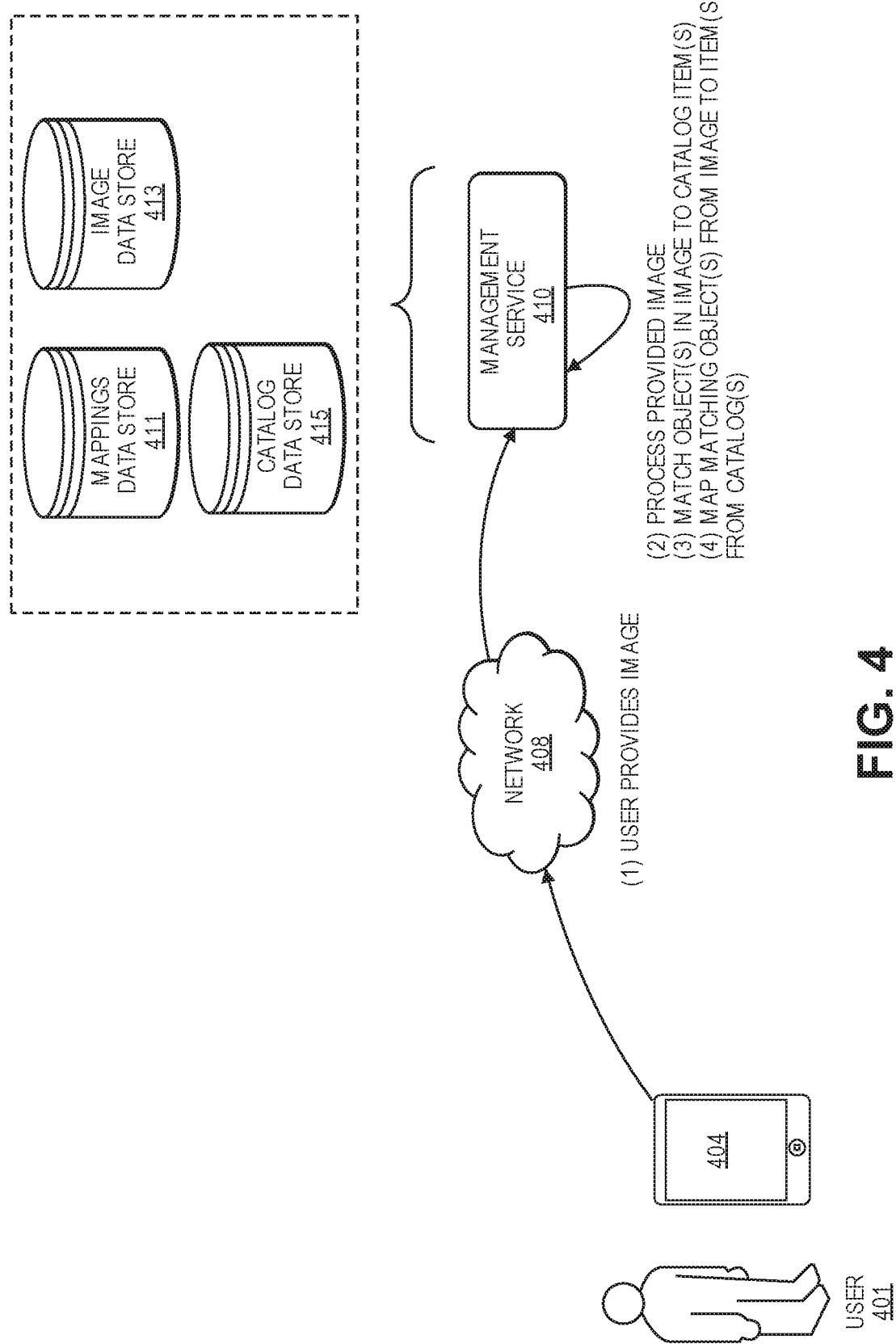

Turning now to FIG. 4, a user 401 may also provide an image that may be matched with an item offered for sale by a seller. In this example, the user 401, using a client device 404, provides an image to the management service 410 via the network 408. The management service, upon receiving the image, stores the image in the image data store 413, processes the provided image, and compares the processed image with the items identified in the item catalog data store 415 to determine if the user provided image includes a representation of an item offered for sale by a seller. Processing of the user provided image may be performed in a similar incremental manner as that discussed above with respect to FIG. 3. For example, a source location identifier of the user provided image may be compared with source location identifiers maintained in the item catalog data store 415, the user provided image may be processed to generate feature vectors that are compared with feature vectors for items identified in the item catalog data store 415, image information associated with the user provided image may be compared with image information from the item catalog data store 415, etc.

If the user provided image is determined to include a representation of an item listed in the item catalog data store 415, the user provided image is associated with the item and/or the seller that offers the item for sale and the association is stored in the mappings data store 411.

Figure 5:
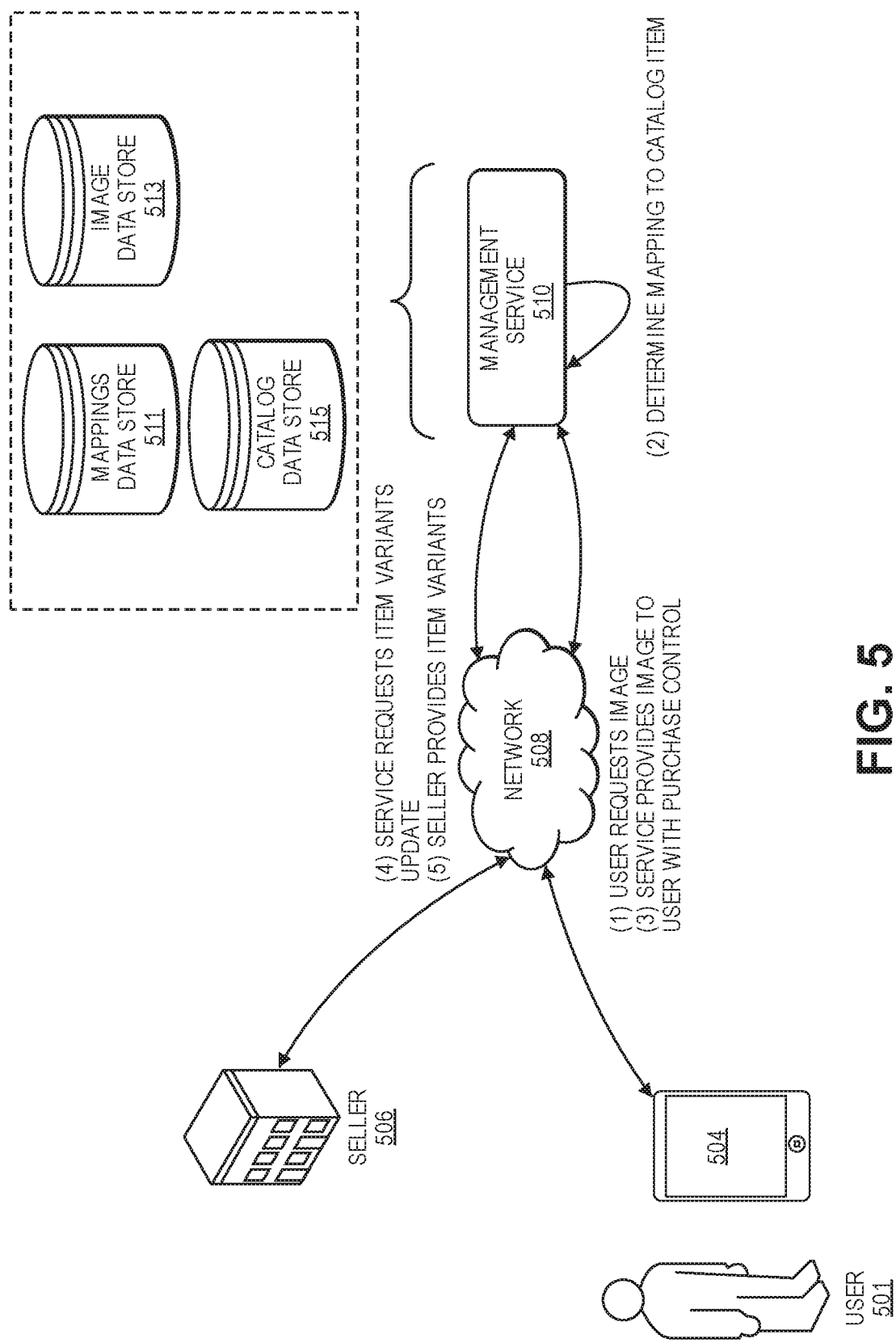
FIGS. 5-6 are block diagrams of an example implementation of facilitating a purchase of a represented item by a user, according to an implementation.
Figure 6:
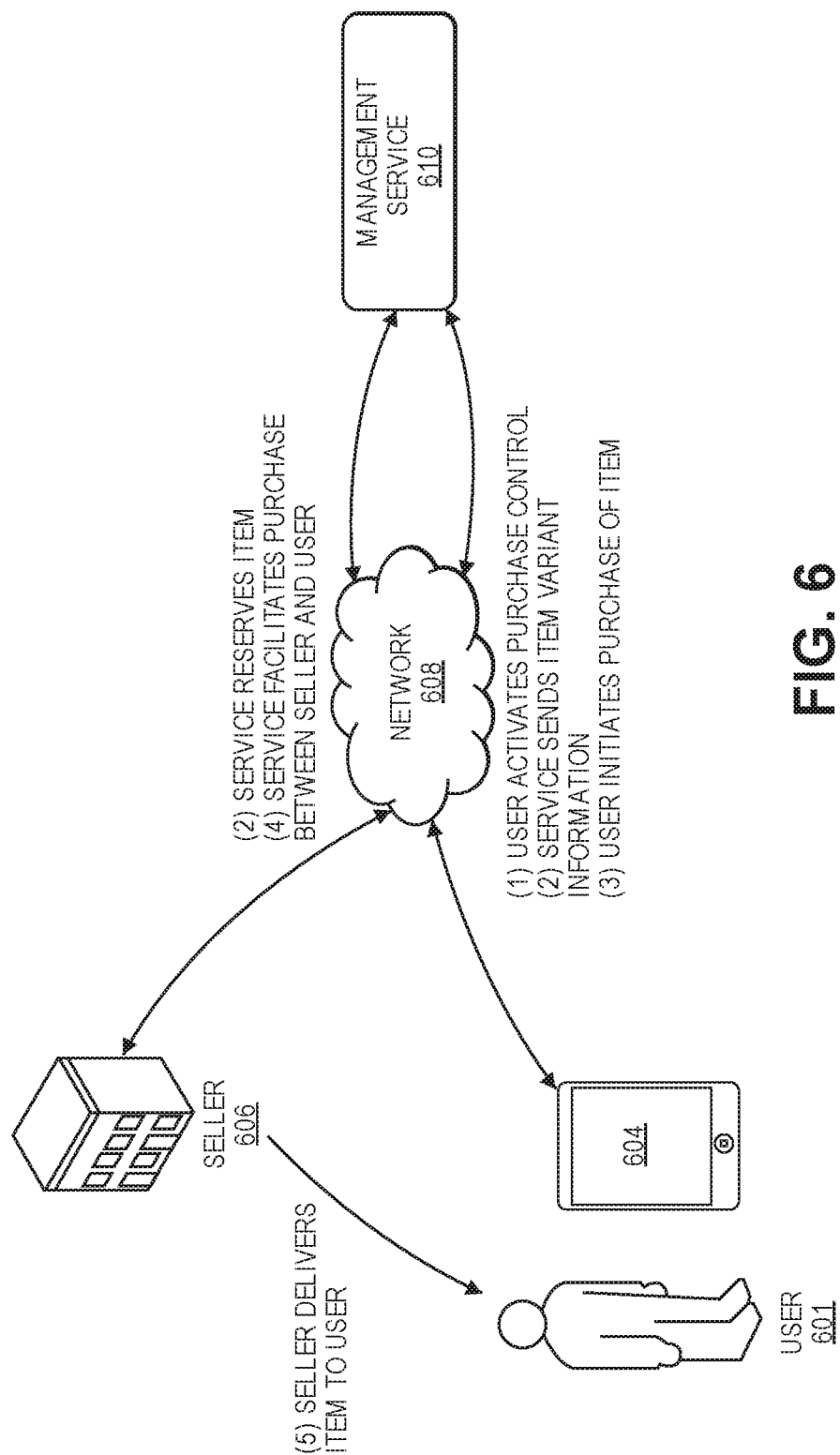

FIGS. 5-6 are block diagrams of an example implementation of facilitating a purchase of a represented item by a user, according to an implementation. Turning first to FIG. 5, the example implementation begins with a user 501 requesting, through a client device 504, to view an image that was provided by a user (the user 501 or any other user) to the management service 510 and stored in the image data store 513. The request is sent from the client device 504 to the management service 510 through a network 508. The management service 510, upon receiving the user's request, queries the mappings data store 511 to determine any associations between the requested image and items offered for sale by a seller. If an association exists between the image requested by the user and an item offered for sale by a seller, as identified in the item catalog data store 515, the management service 510 provides the requested image and a purchase control that is presented to the user. As discussed further below, the purchase control is selectable by the user to obtain additional details about the item represented in the requested image and/or to initiate a purchase of the item from a seller that offers the item for sale. In some implementations, the management service 510 may also provide seller information identifying the seller of the item represented in the image.

In addition to providing the image and purchase control for presentation to the user 501, the management service 510 may also send a request to the seller 506 for item variants related to the item represented in the image that is available for purchase from the seller 506. The seller 506, in response to receiving the request for item variants, may provide the current item variants for the item represented in the image that is available for purchase from the seller 506. In other implementations, rather than, or in addition to the management service 510 sending a request to the seller 506, the seller may periodically send item variant update information to the management service 510. For example, sellers 506 may specify update intervals (e.g., every hour, every day, weekly) and send item catalog and/or item variant updates to the management service that are maintained and used by the management service 510. In some implementations, the seller 506 may be configured to send item variant updates to the management service 510 when an item variant changes (e.g., price changes, quantity available changes). In such implementations, rather than the management service 510 sending a request to the seller 506 for item variant information, the management service 510 may utilize the previously provided and stored item variant information for the item represented in the requested image.

Turning now to FIG. 6, if a user 601 selects or otherwise activates the purchase control that was provided with the image, the request is sent to the management service 610. For example, the requested image and corresponding purchase control may be sent by the management service 610 to the client device 604, via the network 608, and presented to the user 601 on a display of the client device 604. If the user selects the purchase control, the request is sent by the client device 604, via the network 608, to the management service 610.

In response to receiving the request, the management service 610 sends to the client device 604 item variant information corresponding to the item represented in the image and associated with the selected purchase control. In some implementations, the item variant information may be sent with another image(s) of the item, additional details about the seller and/or the sale of the item. In addition, the management service 610 may send to the seller 606, via the network, a reservation request requesting that the seller 606 temporarily reserve the item so that there is a quantity of the item available for sale to the user 601.

If the seller selects to purchase the item, as illustrated in FIG. 6, the purchase request is sent from the client device 604 to the management service 610 and the management service 610 facilitates a purchase of the item between the seller 606 of the item and the user 601. In some implementations, the purchase of the item may be completed without the user 601 having to be redirected to the seller 606. For example, the management service 601 may obtain or have the information necessary to complete the purchase and send that information to the seller 606. For example, as part of the purchase, the user may provide purchase information, such as item details (e.g., size, color), quantity, delivery details (e.g., shipping speed, delivery destination), a payment credentials (e.g., credit card number, bank account number), and/or other information. As discussed further below with respect to FIG. 7, the management service may provide the purchase information to the seller and the seller may complete the purchase of the item for the user. In such an implementation, all aspects of the purchase may be performed by or on behalf of the seller 606, including communication with a payment processor for purchase authorization, updating an inventory count for the sale, etc. When the purchase is authorized, a purchase confirmation is sent from the seller 606 back to the management service 610.

In another example, the management service may facilitate a payment (e.g., via a third party payment processor) by the user for the item on behalf of the seller and provide the seller with a payment confirmation. In addition to the payment confirmation, the management service 610 may provide the seller with any item variants selected by the user (e.g., size, color, shipping option), a delivery destination specified by the user, etc.

The seller 606, upon completing the purchase and/or receiving a purchase confirmation, initiates delivery of the item to the user. For example, if the item is a physical good, the seller 606 may cause the item to be delivered to a user specified delivery location. Likewise, if the item is a digital good, the item may be transmitted from the seller to the user 601, for example, via the network 608. The management service 610 may provide a confirmation message to the user 601 that the purchase of the item from the seller 606 has been completed.

As described, the implementations provide the ability to determine items represented in user provided images and match those items with a seller that offers the item for sale. While the examples described herein refer to a single seller as offering the item for sale, in other implementations, an item represented in a user provided image may be available for sale from multiple sellers. For example, if the item represented in the image is a sports shoe, that item may be available from multiple different sellers of sports shoes. In such an implementation, the user provided image of the item may be associated with each of the sellers and a mapping maintained in the mappings data store maintained by the management service. In some implementations, a single seller may be associated with the purchase control when the user provided image and the corresponding purchase control are sent to a requesting user. The single seller may be randomly selected, selected based on price, selected based on the user's past purchase history, the location of the user and the seller, and/or any other factor. Alternatively, the user may be provided a list of sellers upon activation of the purchase control.

Figure 7:
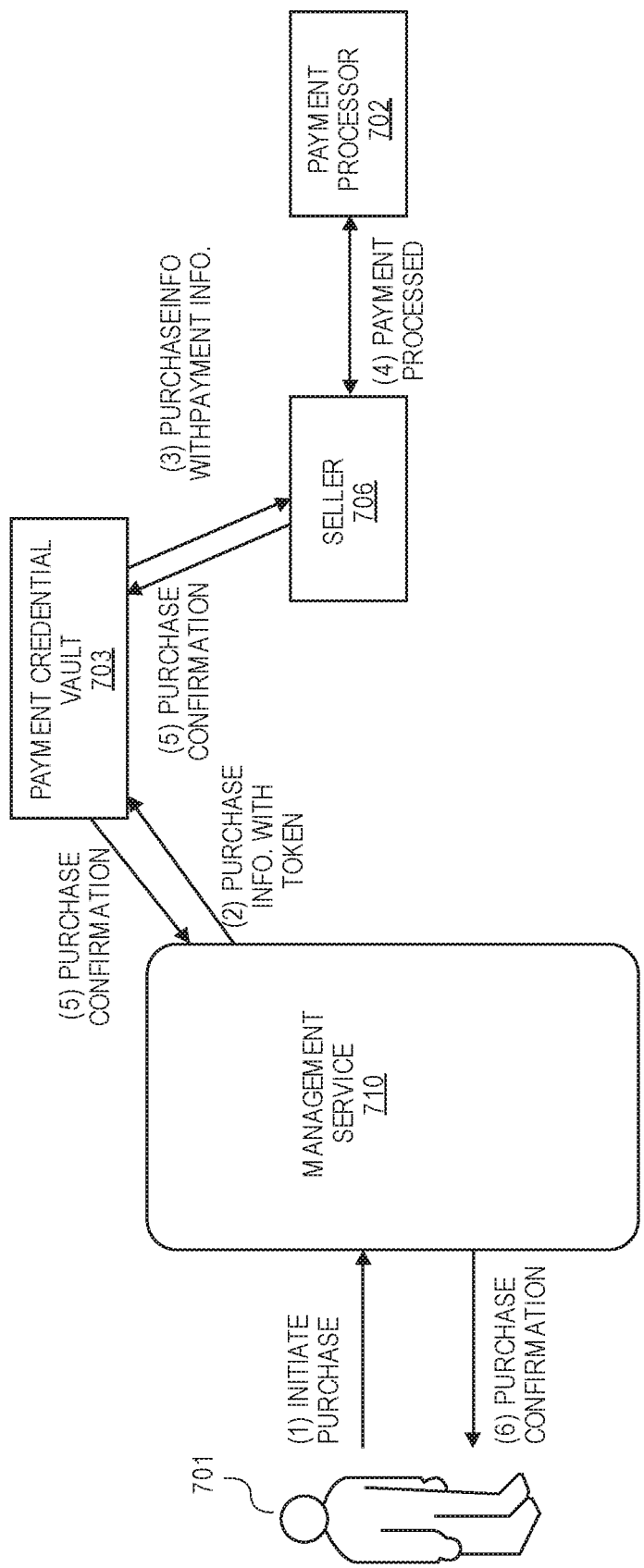
FIG. 7 is a block diagram of a purchase process, according to an implementation.

FIG. 7 is a block diagram of a purchase process, according to an implementation. As discussed above, the management service 710 may facilitate a purchase of an item between a user 701 and a seller 706. In the implementations discussed herein, a user of the management service may purchase an item from a seller other than the management service without ever leaving the website of the management service. At the same time, the seller is able to promote and sell their goods via the management service, even using images provided by users of the management service that are independent of the seller and/or the management service.

When a user 701 selects desired item variants and initiates a purchase of an item, the management service 710 receives the purchase request and the selected item variants. The management service may also maintain in the user profile data store purchase information (e.g., credit card, billing information, and delivery information) for the user, and/or the user may provide such information as part of the purchase request.

In the example illustrated in FIG. 7, the management service 710 obtains all the information needed to enable the seller 706 to complete a purchase of the item. The purchase information may include, a user name or identifier, address, billing address, item information, selected item variants, shipping information, price, payment credentials, etc. In some implementations, some of the purchase information may be maintained in a data store of the management service. For example, if the user has established a user account with the management service, the user's profile may include the user name or identifier, address, shipping information, billing address, and/or payment credentials. In some implementations, the payment credentials, such as a credit card may be stored in a payment credential vault 703, which may be maintained by a third party, such as AUTHORIZE.NET, STRIPE, BRAINTREE, etc. If the payment credential for a user is stored in a payment credential vault 703, a token may be associated with that payment credential that is provided to the management system and maintained in the user profile.

If the user is providing a new payment credential, the provided payment credential may be sent by the management service 710 to payment credential vault 703 and the payment credential vault 703 may provide a token representative of the payment credential back to the management service.

When the purchase information is sent by the management service, rather than including the actual payment credential, the token provided by the payment credential vault is included in the purchase information. In some implementations, the purchase information, including the token rather than the actual payment credential, may be sent directly from the management service 710 to the seller 706. For example, if the payment processor 702 used by the seller 706 to process payments is the same entity as the payment credential vault 703, the purchase information with the token may be sent directly to the seller 706 and the seller may in-turn send the token to the payment processor 702 for payment processing and authorization. The payment processor 702, having knowledge of both the token and the payment credential associated with the token, is able to process and authorize the purchase based on the associated payment credential.

In another implementation, the seller 706 may forward the received token to the payment credential vault 703 and the payment credential vault will send the payment credentials to the seller and/or to the payment processor associated with the seller to enable processing and authorization of the payment for the item to be purchased. In such an implementation, the payment credential vault may determine that the intended recipient of the payment credential is compliant with one or more standards, such as the payment card industry (PCI) compliance standards. In addition, transmission of the payment credentials may be sent using a secure connection. In such an implementation, a purchase identifier that identifies the purchase and/or a seller identifier that identifies the seller of the item may be included with the token and sent to the payment credential vault 703. Likewise, the purchase information may be sent to the seller 706 along with the purchase identifier. The purchase identifier is then used by the seller 706 and the payment credential vault 703 to coordinate and confirm payment for the purchase.

Alternatively, the purchase information with the token may be sent from the management service to the payment credential vault 703 along with a seller identifier that indicates the seller to which the payment information is to be forwarded. The payment credential vault, upon receiving the purchase information, replaces the token with the payment credential and sends the purchase information with the actual payment credential to the seller 706. In such an implementation, the payment credential vault may determine that the intended recipient of the payment credential is compliant with one or more standards, such as the PCI compliance standards. In addition, transmission of the payment credentials may be sent using a secure connection. The seller, upon receiving the payment credentials, provides the payment credentials to the associated payment processor 702 for processing and authorization.

The payment processor 702 processes and confirms that the payment is authorized and sends back to the seller 706 a payment transaction identifier and an indication that the payment is authorized. The seller, in response, may send a purchase confirmation back to the management service 710 confirming that the purchase is complete. In some implementations, the purchase confirmation sent from the seller 706 to the management service 710 is sent directly from the seller 706 to the management service 710. Alternatively, the purchase confirmation may be sent from the seller 706 to the management service 710, via the payment credential vault 703. The management service 710, upon receiving the purchase confirmation, may send a notification to the user confirming that the seller has confirmed purchase of the item. When the seller initiates delivery of the item, the funds may be retrieved from the payment processor and the transaction completed.

If the payment processor is not able to authorize the payment, the payment processor sends back to the seller a payment not authorized notification. If the payment is not authorized, one or more reasons (e.g., invalid payment information) may be provided with the payment not authorized notification. The seller 706 may then send to the management service 710 the reason for the failure and the management service 710 may obtain from the user the needed information in an effort to complete the payment.

With the implementations described with respect to FIG. 7, the user is able to purchase an item directly from the seller 706 through the management service 710 without the management service having to transmit the payment credentials to the seller. Likewise, the purchase is processed by the seller and associated payment processor 702 as if the purchase had occurred directly with the seller. In such a configuration, the available inventory for both the seller and the management service is automatically updated, all order details are consolidated and maintained by the seller, etc.

Figure 8:
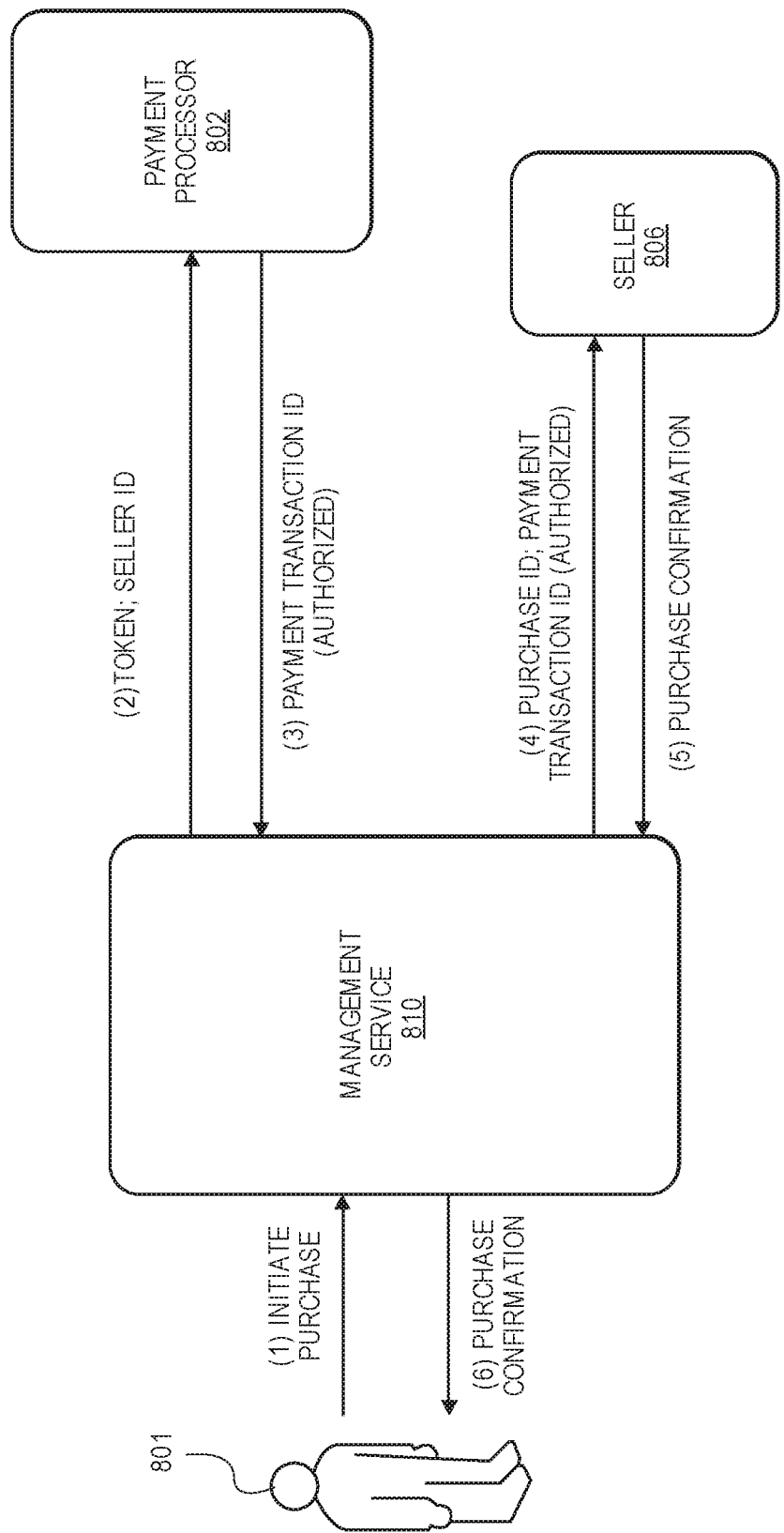
FIG. 8 is another block diagram of a purchase process, according to an implementation.

FIG. 8 is a block diagram of another purchase process, according to an implementation. As discussed above, the management service 810 may facilitate a purchase of an item between a user 801 and a seller 806. In the implementations discussed herein, a user of the management service may purchase an item from a seller other than the management service without ever leaving the website of the management service. At the same time, the seller is able to promote and sell their goods via the management service, even using images provided by users of the management service that are independent of the seller and/or the management service.

When a user 801 selects desired item variants and initiates a purchase of an item, the management service 810 receives the purchase request and the selected item variants. The management service may also maintain in the user profile data store purchase information (e.g., credit card, billing information, and delivery information) for the user, and/or the user may provide such information as part of the purchase request.

Based on the relationship between the management service and the seller of the item, payment for the item may be completed differently. In one implementation, the seller of the item may maintain a payment account with a third party payment processor 802 that accepts payments for purchases facilitated by the management service 810. In such a configuration, no purchase details of the user are provided to the seller 806 and the seller remains the seller of record. When a purchase is made, the payment is processed by the third party payment processor 802 and made to the seller's account that is maintained by the third party payment processor 802. In another configuration, the seller may be their own payment processor. In such a configuration, the user's purchase details may be provided from the management service 810 to the seller 806 and the seller may process payment for the item.

In either configuration, upon receipt by the management service 810 of a purchase request from a user 801, the total cost for the purchase (e.g., price, tax, shipping), the payment token that identifies the purchase transaction and the seller identifier is sent to the payment processor 802 (either the third party payment processor, or the payment processor of the seller). The payment processor 802 processes and confirms that the payment is authorized and sends back to the management service 810 a payment transaction identifier and an indication that the payment is authorized.

The management service, upon receiving the payment transaction identifier, sends the payment transaction identifier to the seller 806 confirming that the purchase has been authorized. The seller, in response, may send a purchase confirmation back to the management service 810 confirming that the purchase is complete. Likewise, the management service may send a notification to the user confirming that the seller has confirmed purchase of the item. When the seller initiates delivery of the item, the funds may be retrieved from the payment processor and the transaction completed.

In still another implementation, the management service 810 may prepare a fully configured order that includes the item to be purchased, item variant information (e.g., quantity, color, size), shipping information, user information necessary for the seller to complete a sale of the item to the user (e.g., user information, payment information), and the like. The fully configured order may then be sent directly to the seller 806. A seller 806, upon receiving a fully configured order from the management service 810 processes the order and returns to the management service 810 either a purchase confirmation or an error indicating that the purchase was not completed for one or more reasons (e.g., invalid payment information). The management service 810 may send a notification to the user 801 confirming that the seller has confirmed purchase of the item or that there was an error with the purchase request. If an error occurred, the management service 810 may obtain from the user, information needed to resolve the error and provide that information to the seller 806 so that the purchase of the item from the seller can be completed.

In addition to the management service determining multiple sellers for an item represented in an image, in some implementations, multiple items may be represented in a single user provided image. In such instances, the image may be segmented based on the various positions of the represented items, sellers determined for the different items, and different purchase controls presented with each of those items.

Figure 9:
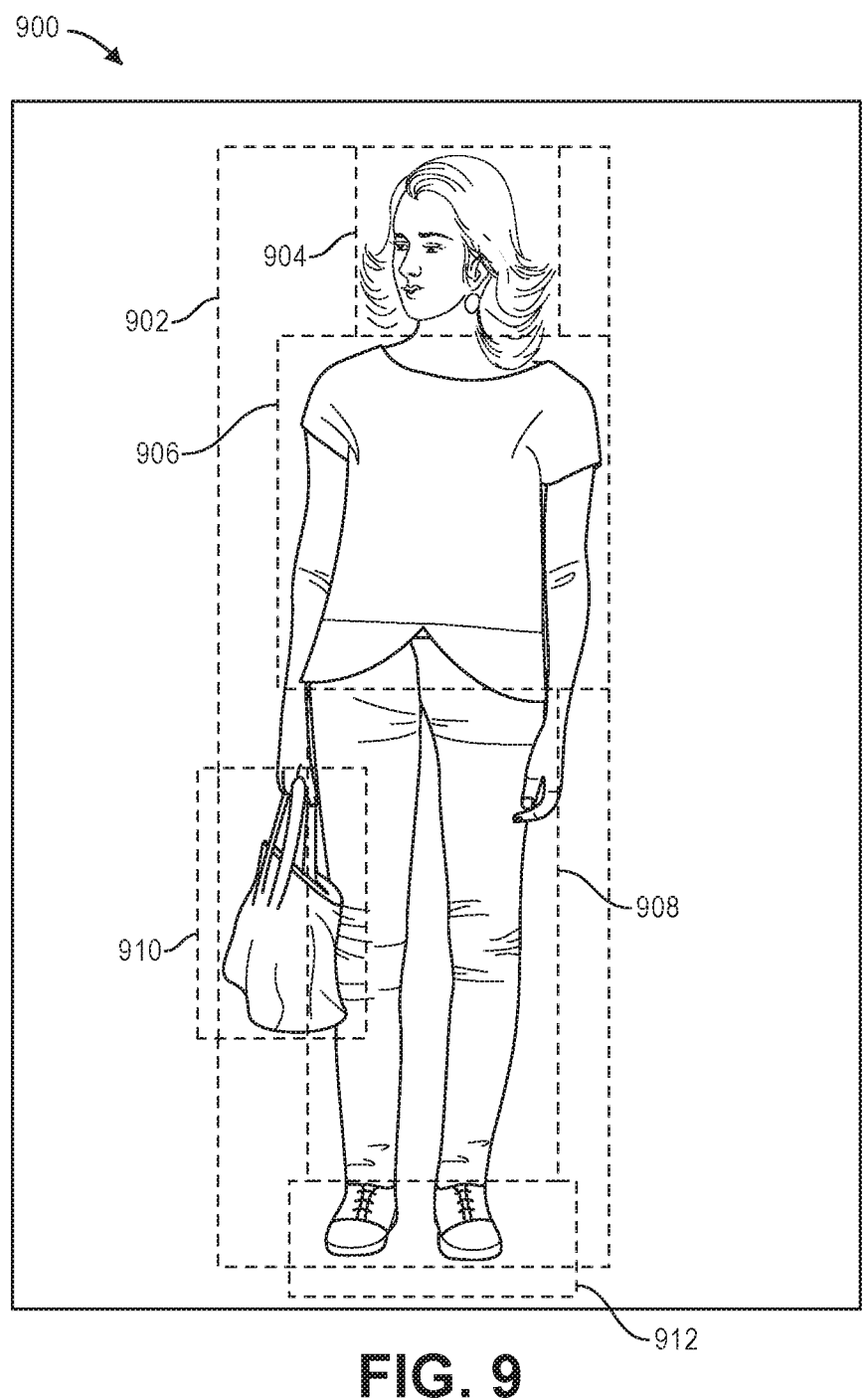
FIG. 9 is a representation of a segmented image, according to an implementation.

For example, referring to FIG. 9, illustrated is a representation of a segmented user provided image that includes a plurality of items offered for sale by different sellers, according to an implementation. An image, such as image 900, may be segmented using image segmentation techniques. For example, a background of the image may be determined (e.g., based on out of focus regions and/or similar colors) and removed from processing. Likewise, six objects have been identified and the image segmented into six different regions. Specifically, a body object 902, a head object 904, a shirt object 906, a pants object 908, a bags object 910, and a shoes object 912. As part of the segmenting, the root object, in this example the body object 902, was determined and the location of other objects 904-912 considered when identifying those other objects. Segmentation of images is described in further detail in U.S. patent application Ser. No. 14/279,871 entitled "Image Based Search," which is herein incorporated by reference in its entirety.

In other implementations, an image may be segmented using other segmentation and identification techniques. For example, images may be segmented using crowd sourcing techniques. For example, as users view an image, they may select regions of the image that include objects and the image may be segmented based on the location of objects within the image. As more users identify objects within images, the confidence of the identity of those objects increases. Based on the user provided segmentation and identification, the objects within the image can be identified and a determination made as to whether the object is an item offered for sale by a seller.

For example, each segment may be processed to generate feature vectors for the item represented in the segment and those feature vectors may be compared with feature vectors associated with items identified in the item catalog data store. Alternatively, or in addition thereto, the segments of the image may be processed and the item classified into one or more categories. For example, the shirt object 906 of the image 900 may be processed to detect the object (shirt)

represented in the segment that contains the shirt object 906 and the segment may be associated with a category representative of shirts (or another relevant category). As discussed above, the representation of the object (shirt) may be compared with items offered for sale by sellers associated with the category shirts and/or compared with items offered for sale that are associated with the category shirts to determine if the object represented in the segment of the image corresponds with an item offered for sale by a seller. This processing may be done for each object and/or segment of the image to determine items represented in the image that are offered for sale by one or more sellers.

Figure 10:
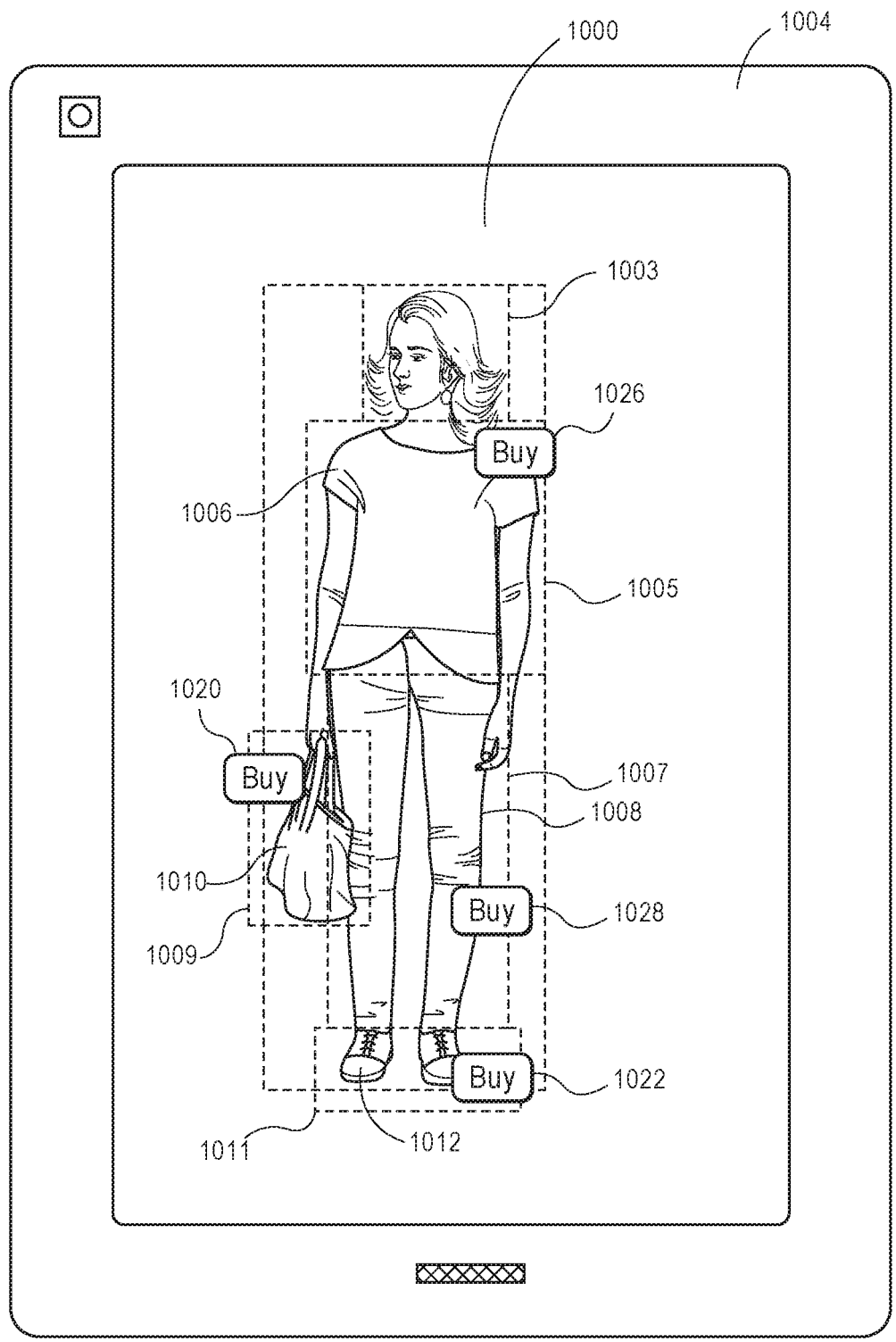
FIG. 10 is a representation of a segmented image with purchase controls associated with represented items available for purchase from one or more sellers, according to an implementation.

FIG. 10 is a representation of a segmented image 1000 presented on a display of a client device 1004 with purchase controls associated with objects of the image that are determined to be items offered for sale by one or more sellers, according to an implementation. For each item determined in the segmented image to be available for purchase from one or more sellers, a purchase control may be presented near the determined item that is selectable by the user. In this example, a shirt 1006 has been determined in a first segment 1005 of the image 1000 and a purchase control 1026 is presented near the presentation of the shirt. Similarly, a bag 1010 has been determined in a second segment 1009 of the image and a purchase control 1020 is presented near the presentation of the bag. A pair of pants 1008 has been determined in a third segment 1007 of the image 1000 and a purchase control 1028 is presented near the presentation of the pants 1008. Finally, a pair of shoes 1012 has been determined in a fourth segment 1011 of the image 1000 and a purchase control 1022 is presented near the presentation of the shoes 1012.

While the majority of the segments of the image 1000 have been determined to include a representation of an item offered for sale by a seller, the segment 1003 that includes the object of a person's head is determined to not include an item that is offered for sale by the seller. Because the object (person's head) represented in the segment 1003 is determined to not be an item offered for sale by a seller, a purchase control is not presented near the presentation of that object.

Figure 11:
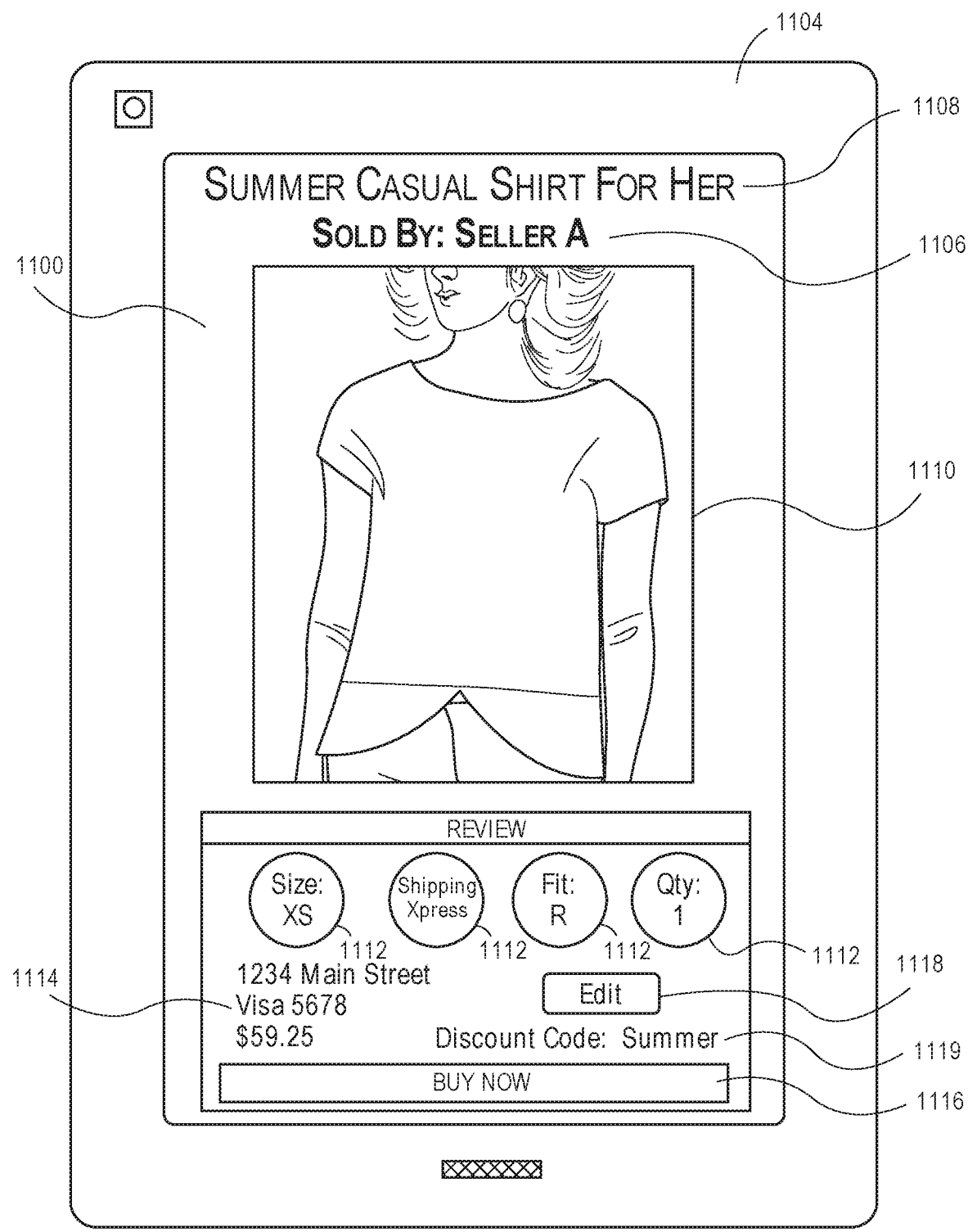
FIG. 11 is a representation of an item and item variants available from the seller of the item, according to an implementation.

A user may view the image 1000 on the client device 1004 and selectively interact with one or more of the purchase controls to obtain additional details about an item associated with the purchase control. For example, FIG. 11 is a representation of an item and item variants for the shirt item, according to an implementation. The information 1100 presented on the display of the client device 1104 is generated in response to the user selecting the purchase control 1026 (FIG. 10) associated with the shirt item. In this example, upon selection of the purchase control 1026, an additional view 1110 of the shirt item is presented to the user along with a name 1106 of the seller of the item, in this example Seller A, from which the item may be purchased. A name of the item "Summer Casual Shirt For Her" 1108 may also be included in the presented information 1100. The management service, as discussed above, may also obtain and provide item variant information 1112, such as a size, fit, color, shipping method, and/or quantity of the shirt. The user may alter or select item variant information by, for example, interacting with the presentations of the item variant information. In addition, a user may also be presented with purchase and/or shipping information 1114 that is currently associated with the user of the client device 1104 that will be used by the management service to facilitate a purchase of the item if the user selects the "Buy Now" control 1116. A user may alter the purchase and/or shipping information 1114 by selecting the "Edit" control 1118 and providing or selecting alternative information. Any type or form of payment method may be used with the implementations discussed herein. For example, the user profile maintained by the management service that is associated with the user may include credit card information, as illustrated, that is used to facilitate a purchase between the user and the seller of the item. In other implementations, other forms of payment, such as bank transfers, e-commerce payment processors, etc. may likewise be utilized.

In some implementations, a discount code 1119 or other promotion may be associated with the item represented in the additional view 1110. For example, if Seller A 1106 is offering a promotion for the item that is received if a discount code 1119 is provided as part of the checkout process, the discount code 1119 may be automatically identified and included in the information 1100 presented on the display of the client device 1104. In some implementations, the discount code 1119 is provided by the seller as an item variant for the item. In other implementations, a user may alter, update or provide a discount code 1119 by selecting the discount code 1119 and providing such information.

The additional view 1110 of the item may be in the form of a digital still image, a video file, an animated .gif file, etc. For example, the additional view 1110 may include a presentation of an animated .gif file that can be manipulated by a user to alter a presented view of the item. For example, if the client device 1104 includes a touch-based display, a user may manipulate or control the presentation of the .gif file by moving their finger on the touch-based display to obtain different views of the presented item. In one implementation, the user may control the presentation of the image and rotate the image to obtain front, back, side and/or other views of the image, effectively providing a 360 degree view of the image.

In some implementations, a user may view and/or provide comments, reviews, ratings, and/or other information related to the item represented in the additional view 1110. In some implementations, a user may also be presented with an identification of related items often viewed or purchased with the item represented in the additional view 1110. A related item is an item that is often purchased with the item or view by users when viewing the item represented in the additional view 1110. For example, if other users of the management service often purchase the item "Summer Causal Shirt For Her" from Seller A and also purchase a pair of matching shorts, the information 1100 may also identify the pair of matching shorts to the user as an item that is often purchased with the item represented in the additional view 1110. The user may obtain additional information about the pair of matching shorts by selecting the identified pair of matching shorts.

Figure 12:
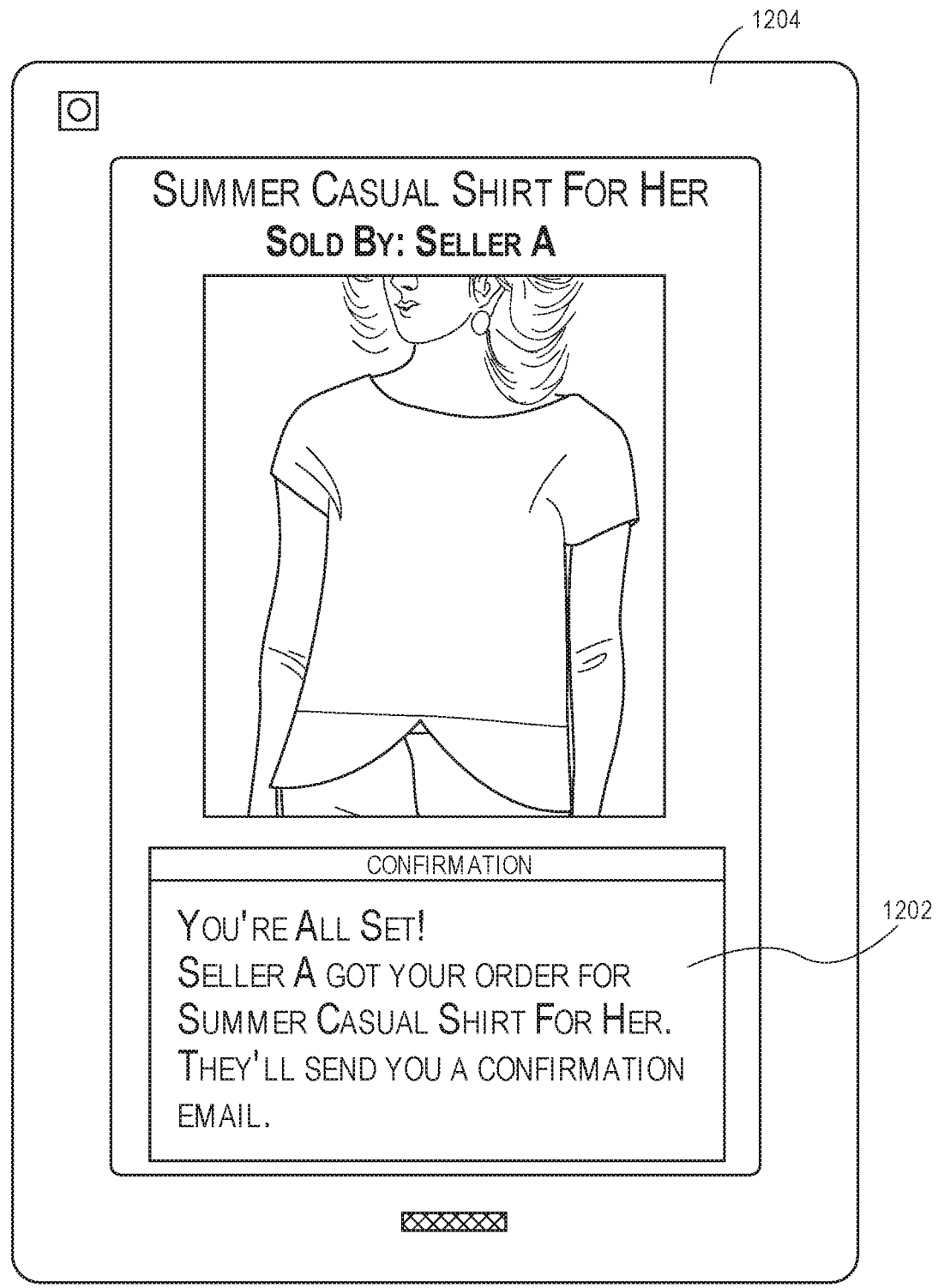
FIG. 12 is a representation of a purchase confirmation for an item, according to an implementation.

If a user selects the "Buy Now" control 1116, the management service facilitates a purchase of the item between the user and the seller. Facilitating purchase of the item is discussed above with respect to FIGS. 7 and 8. In addition to facilitating purchase, the management service may also send a confirmation message to the user, as illustrated in FIG. 12. In this example, the management service sends to the client device 1204 a confirmation message 1202 identifying that the seller of the item received the order from the user for the item and that the seller will send the user a confirmation email.

Figure 13:
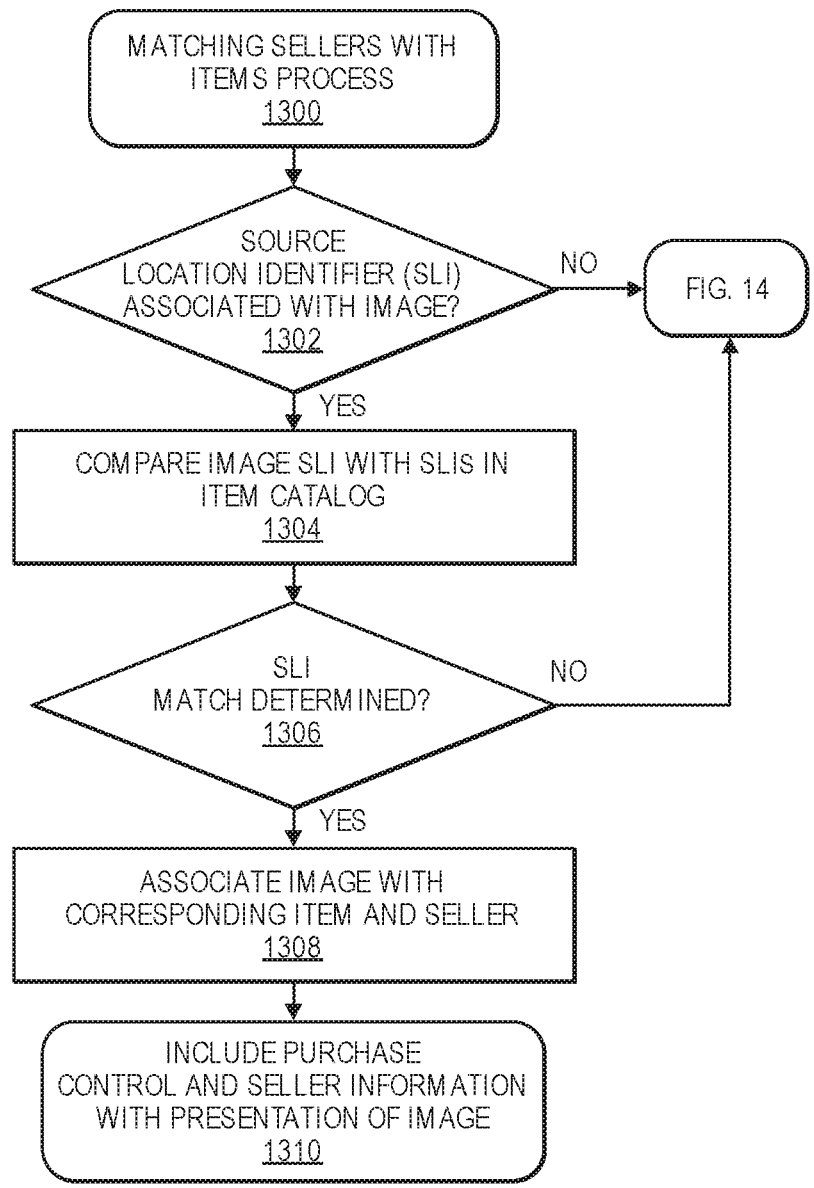
FIG. 13 illustrates an example process for matching sellers with user provided representations of items, according to an implementation.

FIG. 13 illustrates an example process 1300 for matching sellers with items, according to an implementation. The example process 1300 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 1300 begins by determining if there is a source location identifier, such as a URL, GPS coordinates, barcode, etc., included in the image information of a user provided image, as in 1302. As discussed above, a user provided image may be already stored in an image data store of the management service or may be provided to the management service by the user. The user provided image may be any image or representation of an object that is provided by the user to the management service. For example, the user provided image may be an image obtained with an image capture device of a user's client device, an image copied from another website, an image from an electronic message, etc.

An image may include a source location identifier, such as a URL, if the image is obtained from another location (e.g., a website) on a network, such as the Internet. In another example, the source location identifier may identify a physical location at which the image was captured by an image capture device (camera). For example, when a camera obtains an image, it may include in the image information the GPS coordinates (latitude and longitude) identifying the position of the image capture device when the image was obtained.

If it is determined that the user provided image does not include a source location identifier, the example process 1300 proceeds to the example process 1400 discussed below with respect to FIG. 14. However, if it is determined that the user provided images does include a source location identifier, the source location identifier of the user provided image is compared to source location identifiers maintained in the item catalog data store, as in 1304. As discussed above, the item catalog data store maintains a list of items offered for sale by one or more sellers. As the source location identifiers are compared, a determination is made as to whether the source location identifier of the user provided image matches a source location identifier of an item identified in the item catalog, as in 1306.

If it is determined that the source location identifier of the user provided image does not match any of the source location identifiers of the items in the item catalog data store, the example process 1300 proceeds to the example process 1400 discussed below with respect to FIG. 14. If it is determined that the source location identifier of the user provided image does match a source location identifier of an item in the item catalog data store, the user provided image is associated with the corresponding item from the item catalog data store and/or the seller that offers the item for sale, as in 1308. This association is maintained in the mapping data store by the management service.

Based on the association between the user provided image and the item identified in the item catalog data store and/or the seller of the item, each time the user provided image is presented to a user, such as when a user requests to view the user provided image, the presentation of the image will include a purchase control and/or seller information, as in 1310. The purchase control, as discussed above, may be selected by the user to obtain additional information about the item represented in the user provided image and/or to initiate a purchase of the item. The seller information identifies a seller of the item represented in the image. If multiple sellers are associated with the item represented in the image, the seller information may identify one of the sellers, a seller determined based on a provided advertising amount for the item, multiple sellers, provide an indication that more than one seller is offering the item represented in the user provided image for sale, etc. A user requesting to view the user provided image may be the user that provided the image, or any other user of the management service.

While the example illustrated in FIG. 13 describes matching a user provided image with a seller if the source location identifier of the user provided image matches the source location identifier of an item listed in the item catalog data store, in some implementations, additional analysis may be performed before the user provided image is determined to include a representation of the item offered for sale by the seller. For example, the user provided image may be processed to determine if the image is similar to or matches the image or the image information included with the item identified in the item catalog as having a matching source location identifier. In other implementations, additional image information, such as a creation date, file size, hash value, color histogram, etc., may be compared to obtain additional confirmation that the user provided image includes a representation of the item offered for sale by the seller. In some implementations, all or a portion of FIG. 14 may be performed in conjunction with the example process 1300.

Figure 14:
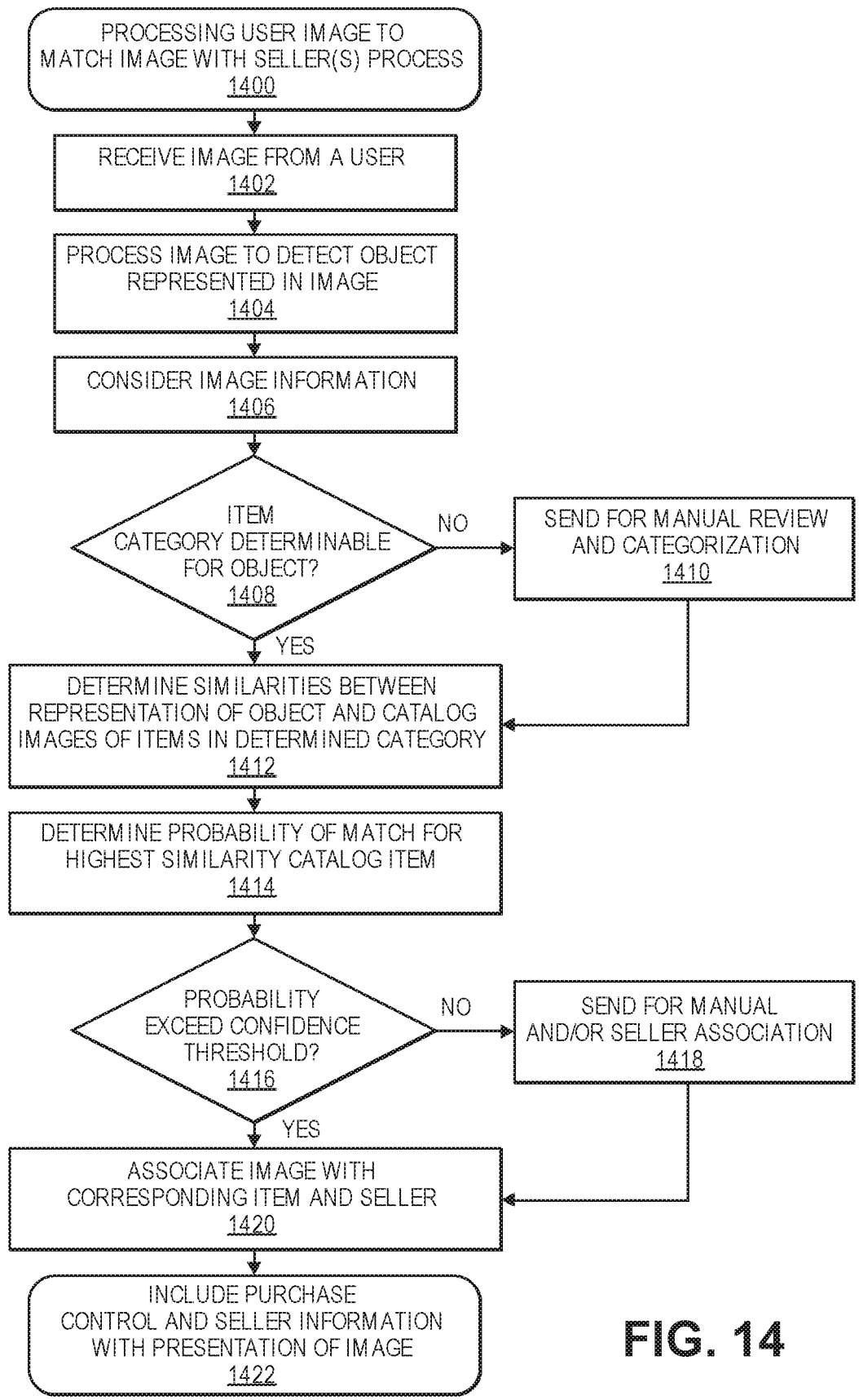
FIG. 14 illustrates an example process for processing a user provided image to match an item represented in the image with a seller of the item, according to an implementation.

FIG. 14 illustrates an example process 1400 for processing a user provided image to match an item represented in the image with a seller of the item, according to an implementation. The example process 1400 begins by receiving the image from a user, as in 1402. The received image is then processed using one or more image processing algorithms, such as edge detection, object detection, grey scale analysis, etc., to determine objects represented in the image, as in 1404. In some implementations, feature vectors representative of the image and/or objects within the image may also be generated.

In addition to processing the image, image information such as source location identifier, comments added by the user that provided the image, comments added by users that viewed and/or shared the image, the time, date and/or location associated with the image, etc., may also be considered, as in 1406. Based on the processed image and the image information, a determination is made as to whether an item category can be determined for an object represented in the image, as in 1408. In some implementations, the management service may maintain a list of item categories for items that are offered for sale by different sellers. Each item category may include one or more item characteristics, such as a description, representative images of items associated with the item category, representative shapes, sizes and/or colors of items that may be associated with the item category, etc. Likewise, a seller may be associated with an item category based on the types of items that the seller offers for sale. Likewise, items offered for sale may be associated with one or more item categories based on the item type.

In determining if the object represented in the user provided image may be associated with an item category, the processed image and/or image information is compared with the characteristics of each item category to determine if the object represented in the image is similar to an item category. For example, the size, shape and/or color of the determined object may be compared with the size(s), shape(s), and color(s) characteristics of an item category to determine a similarity between the object and the item category.

If the object represented in the user provided image cannot be associated with an item category, the image is sent for manual review and categorization, as in 1410. Manual review and categorization may include one or more humans reviewing the user provided image to determine a category for the object represented in the image. The human(s) may be an employee of the management service, a user of the management service, a seller, etc.

If it is determined that the object represented in the image can be associated with a category, or upon manual categorization, similarities between the object represented in the user provided image and the images of the item catalog associated with the determined category are determined, as in 1412. For example, the processed image information (e.g., feature vectors, histogram) from the user provided image may be compared with image information relating to the images corresponding to the items identified in the item catalog to determine a similarity between the images.

Based on the similarities between the user provided image and the stored images, a probability is determined for the stored image having the highest similarity to the user provided image, indicating how likely it is that the stored image corresponds to the user provided images, as in 1414. The probability may be based on a difference between the determined similarity scores. For example, if the highest similarity score is 95% and the next highest similarity scores are 45% and 34%, there may be a high probability that the stored image having the highest similarity score corresponds with the user provided image. In comparison, if the highest similarity score is 95% and the next highest similarity scores are 94% and 93%, even though the images are similar, there is a low probability that the stored image with the highest similarity score corresponds to the user provided image because any of those images may actually include the item represented in the user provided image.

Based on the probability score for the stored image with the highest similarity, a determination is made as to whether the probability exceeds a confidence threshold, as in 1416. The confidence threshold may be any number, score, or other indicator that must be achieved for the probability score to exceed the threshold. The confidence threshold may be different for different images, different users, different times of day, etc.

If the probability score does not exceed the threshold, the image is sent for manual association by one or more humans, as in 1418. In some implementations, the image, image data, stored images associated with items in the item catalog corresponding to the same category, and/or the stored images having the highest similarity scores may also be sent to the one or more humans for manual association. The one or more users may be employees of the management service, employees of the potential seller of the item, users of the management service, etc.

If it is determined that the probability exceeds the confidence threshold, or upon manual association, the user provided image is associated with the item identified in the item catalog and/or the seller of the item identified in the item catalog, as in 1420. This association is maintained in the mapping data store by the management service.

Based on the association between the user provided image and the item identified in the item catalog data store and/or the seller of the item, each time the user provided image is presented to a user, such as when a user requests to view the user provided image, the presentation of the image will include a purchase control and/or seller information, as in 1422. The purchase control, as discussed above, may be selected by the user to obtain additional information about the item represented in the user provided image and/or to initiate a purchase of the item. The seller information identifies a seller of the item represented in the image. If multiple sellers are associated with the item represented in the image, the seller information may identify one of the sellers, a seller based on a provided advertising amount for the item, multiple sellers, provide an indication that more than one seller is offering the item represented in the user provided image for sale, etc. A user requesting to view the user provided image may be the user that provided the image, or any other user of the management service.

Figure 15:
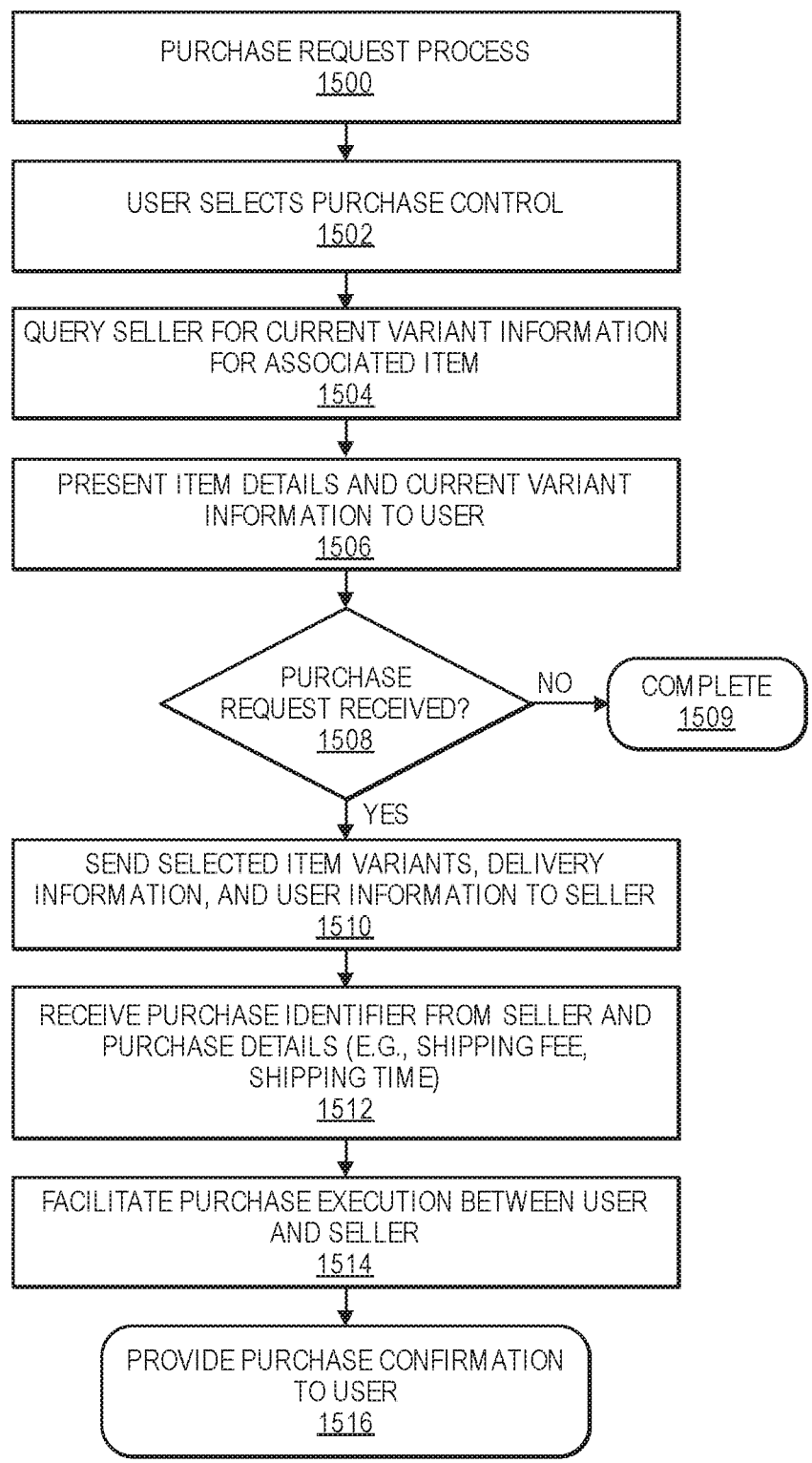
FIG. 15 illustrates an example purchase request process, according to an implementation.

FIG. 15 illustrates an example purchase request process 1500, according to an implementation. The example process 1500 begins upon selection by a user of the purchase control, as in 1502. As discussed above, a purchase control is presented with a user provided image when the user provided image is determined to include a representation of an item offered for sale by a seller.

Upon receiving a selection of a purchase control, the seller is queried for current item variant information corresponding to the item represented in the image, as in 1504. As discussed above, in some implementations, the seller may be queried for item variant information in response to selection of a purchase control, the seller may periodically send item variant information to the management service, and/or the seller may provide updates to item variant information when an item variant changes.

The example process 1500 also sends to the client device of the user, item details and current item variant information for presentation to the user, as in 1506. As illustrated and discussed above with respect to FIG. 11, the presentation to the user may include additional views of the item, current item variant information, purchase details, etc. Likewise, as discussed above, the user may modify and/or select particular item variants for the item that may be used to complete a purchase of the item. For example, the user may select a particular size, color, and/or other variants for an item that may be used in the purchase and/or delivery of the item.

A determination is then made as to whether a purchase request has been received, as in 1508. For example, a user may select to purchase an item upon selecting desired variants and providing purchase details (e.g., delivery destination, credit card information, delivery time). If a purchase request is not received, the example process completes, as in 1509. However, if it is determined that a purchase request has been received, the selected item variants, delivery information, and user information for the user initiating the purchase are sent to the seller of the item, as in 1510.

In response to sending the selected item variants, delivery information, and user information to the seller, the example process 1500 receives from the seller a purchase identifier that identifies the purchase transaction and purchase details (e.g., shipping fee, identification tag, shipping time), as in 1512.

Based on the user provided information, and the seller provided purchase information, the example process 1500 facilitates purchase of the item between the user and the seller, as in 1514. Additional details for facilitating purchase of an item between a user and a seller of the item are discussed in above with respect to FIGS. 7 and 8. Finally, once the purchase has been completed, a purchase confirmation is sent to the user, as in 1516. The purchase confirmation may be sent in the form of a presentation on the user's client device, an electronic message ("e-mail"), a text message, etc.

Figure 16:
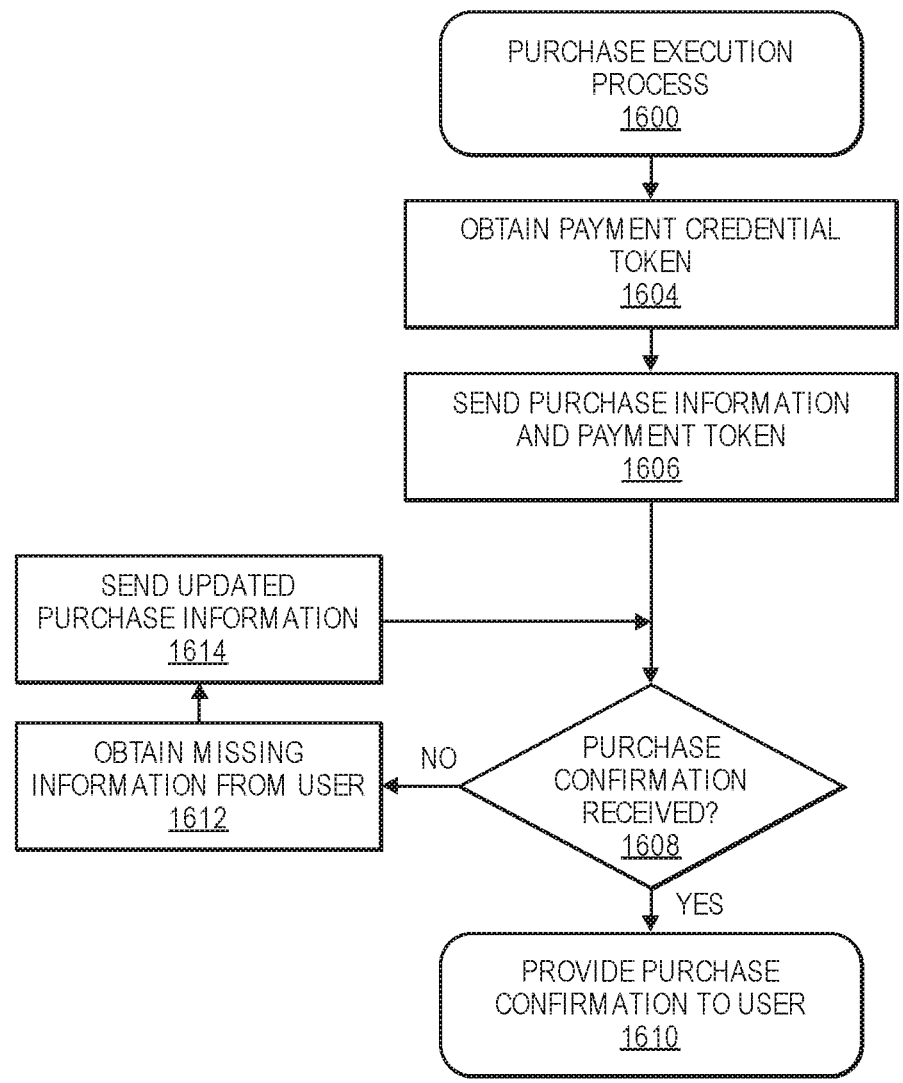
FIG. 16 illustrates an example purchase execution process, according to an implementation.

FIG. 16 illustrates an example purchase execution process 1600, according to an implementation. The example process 1600 provides additional details corresponding to box 1514 (FIG. 15). The example process 1600 begins by obtaining a purchase information and a payment token, as in 1604. As discussed above, the purchase information may include an identification of the item, quantity desired, shipping details (e.g., delivery address, shipping speed), selected item variants (e.g., size, color, etc.). The payment token is a unique identifier provided by a payment credential vault that is associated with a payment credential selected by the user purchasing the item that will be use to authorize the purchase. If the payment token is not already stored, the payment credentials may be obtained from the user, provided to the purchase credential vault, and a payment token obtained.

Upon obtaining the purchase information and payment token, the purchase information, without the payment credentials, and the payment token are sent to the seller that sells the item to be purchased by the user, as in 1606. As discussed above, the purchase information and payment token may be sent from the management service to the seller via a payment credential vault. The payment credential vault, upon receiving the purchase information and payment token, provides to the seller the purchase information and the payment credentials represented by the token so that payment can be processed for the item.

As discussed above, the seller processes the payment using their own or associated payment processor as if the purchase were being made directly with the seller. The payment processor may be the same or different entity than the payment credential vault. In instances when the payment processor and the payment credential vault are the same entity, rather than the payment credential vault providing the payment credentials to the seller, the payment credential vault may process the payment for the item based on the token received from the management service.

Once the seller has confirmed the purchase with the payment processor, the seller sends a purchase confirmation back to the management service. The purchase confirmation may be sent by the seller directly back to the management service and/or via the payment credential vault. If the purchase was not confirmed, the seller sends a failure and/or request for additional information back to the management service.

Returning to the example process 1600, after sending the purchase information and the payment token, a determination is made as to whether a purchase confirmation has been received, as in 1608. If it is determined that a purchase confirmation has been received, a notification is provided to the user to confirm to the user that the purchase of the item from the seller has been successfully completed, as in 1610. The purchase confirmation may be sent in the form of a presentation on the user's client device, an electronic message ("e-mail"), a text message, etc.

If it is determined that a purchase confirmation has not been received, any missing information or needed additional information is obtained from the user as in 1612. For example, if the billing address, or expiration date of the payment credential is out of date, the user may be requested to update such information. When the information is obtained from the user, updated purchase information is sent to the seller, as in 1614, and the example process returns to decision block 1608 and continues.

Figure 17:
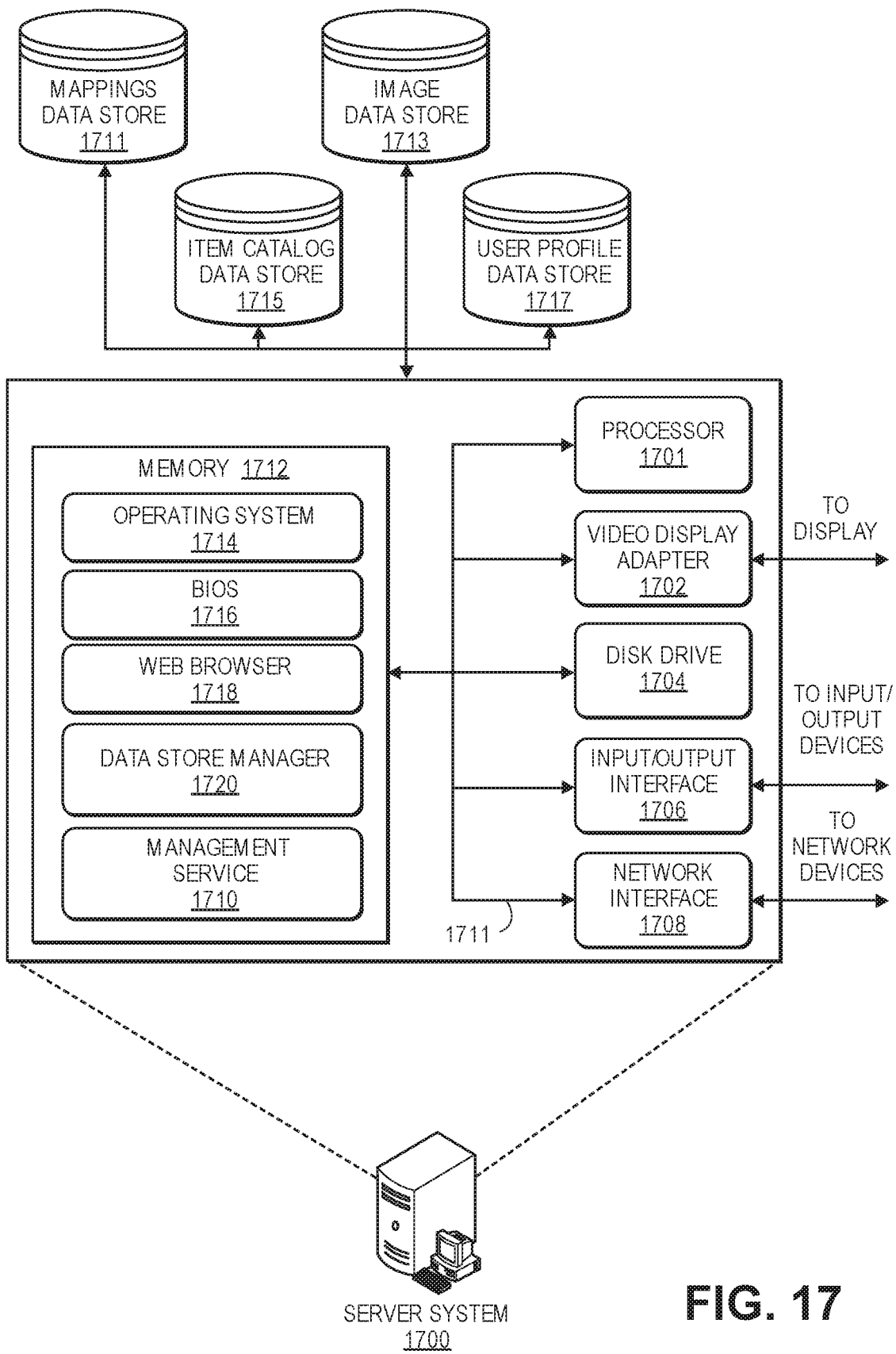
FIG. 17 is a pictorial diagram of an illustrative implementation of a server system that may be used for various implementations.

FIG. 17 is a pictorial diagram of an illustrative implementation of a server system, such as the server system 1700 that may be used in the implementations discussed herein. The server system 1700 may include a processor 1701, such as one or more redundant processors, a video display adapter 1702, a disk drive 1704, an input/output interface 1706, a network interface 1708, and a memory 1712. The processor 1701, the video display adapter 1702, the disk drive 1704, the input/output interface 1706, the network interface 1708, and the memory 1712 may be communicatively coupled to each other by a communication bus 1711.

The video display adapter 1702 provides display signals to a local display (not shown in FIG. 17) permitting an operator of the server system 1700 to monitor and configure operation of the server system 1700. The input/output interface 1706 likewise communicates with external input/output devices not shown in FIG. 17, such as a mouse, keyboard, scanner, or other input and output devices that can be operated by an operator of the server system 1700. The network interface 1708 includes hardware, software, or any combination thereof, to communicate with other computing devices. For example, the network interface 1708 may be configured to provide communications between the server system 1700 and other computing devices, such as the client device 104, via the network 108, as shown in FIG. 1.

The memory 1712 generally comprises random access memory (RAM), read-only memory (ROM), flash memory, and/or other volatile or permanent memory. The memory 1712 is shown storing an operating system 1714 for controlling the operation of the server system 1700. A binary input/output system (BIOS) 1716 for controlling the low-level operation of the server system 1700 is also stored in the memory 1712.

The memory 1712 additionally stores program code and data for providing network services that allow client devices and sellers to exchange information and data files with the server system 1700 and/or the management service 1710. A data store manager application 1720 facilitates data exchange and mapping between the mappings data store 1711, the image data store 1713, the item catalog data store 1715, and/or the user profile data store 1717, client devices, such as the client device 104 shown in FIG. 1, and/or sellers, such as the sellers 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 1700 can include any appropriate hardware and software for integrating with the data stores 1711, 1713, 1715, 1717 as needed to execute aspects of one or more applications for the client device, the sellers and/or the management service 1710. The server system 1700 provides access control services in cooperation with the data stores 1711, 1713, 1715, 1717 and is able to generate content such as text, graphics, audio, video and/or images to be transferred to a client device and/or sellers.

The data stores 1711, 1713, 1715, 1717 can include several separate data tables, databases or other data storage mechanisms and media for storing data relating to a particular aspect. For example, the data stores 1711, 1713, 1715, 1717 illustrated include mechanisms for storing images, user information, mappings and item catalogs from sellers of items, which can be used to generate and deliver content to client devices and/or sellers (e.g., user provided images and purchase controls) and control actions to be performed.

It should be understood that there can be many other aspects that may be stored in the data stores 1711, 1713, 1715, 1717, such as access rights information, preferred sellers, etc., which can be stored in any of the above listed mechanisms as appropriate or in additional mechanisms of any of the data stores 1711, 1713, 1715, 1717. The data stores 1711, 1713, 1715, 1717 are operable, through logic associated therewith, to receive instructions from the server system 1700 and obtain, update or otherwise process data in response thereto.

The memory 1712 may also include the management service 1710, discussed above. The management service 1710 may be executable by the processor 1701 to implement one or more of the functions of the server system 1700. In one implementation, the management service 1710 may represent instructions embodied in one or more software programs stored in the memory 1712. In another implementation, the management service 1710 can represent hardware, software instructions, or a combination thereof.

The server system 1700, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction in FIG. 17 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method of a management service for purchasing items of one or more sellers, wherein the one or more sellers are independent of the management service, comprising:

receiving a request over a network from a user operating a client device to view a user-supplied image stored within an image data store maintained by the management service;

using a processor of the management service:

segmenting the user-supplied image to identify a plurality of image segments of the user-supplied image;

processing each of the plurality of image segments to identify a plurality of distinct items represented within the requested image; and matching at least one distinct item of the plurality of distinct items represented within the requested image to a corresponding item of a plurality of items offered for sale by a seller of the one or more sellers;

providing a presentation of the requested image over the network to the client device operated by the user, wherein the presentation of the requested image includes a purchase control for the at least one distinct item of the plurality of distinct items represented in the requested image for the user to indicate a request to purchase a corresponding item;

receiving a request over the network from the user operating the client device to purchase the at least one distinct item of the plurality of distinct items from the seller;

sending purchase information over the network to the seller to complete a purchase of the at least one distinct item for the user as if the request had been received directly by the seller from the user;

receiving a purchase confirmation from the seller; and providing a notification over the network to the user operating the client device indicating that a purchase of the at least one distinct item from the seller has been completed.

2. The computer-implemented method of claim 1, further comprising:

receiving over the network from the seller, item variant information, wherein the item variant information identifies at least one of a price for the at least one distinct item, a size of the at least one distinct item, or a color of the at least one distinct item.

3. The computer-implemented method of claim 1, wherein presentation of the requested image includes a purchase control for the at least one distinct item of the plurality of distinct items represented in the requested image, wherein the purchase control is further configured to indicate seller information identifying the seller corresponding to the at least one distinct item.

4. The computer-implemented method of claim 1, wherein:

the request from the user to purchase the at least one distinct item includes an indication of a payment credential to be used to process a payment for the at least one distinct item;

the purchase information is sent to the seller over the network through a payment credential vault that maintains payment credentials; and the purchase information includes a unique payment token that was provided by the payment credential vault as representative of the payment credential.

5. The computer-implemented method of claim 1, wherein the request from the user to purchase the at least one distinct item includes an indication of a payment credential to be used to process a payment for the at least one distinct item; and wherein the method further comprises:

determining a payment token representative of the payment credential, the payment token provided by a payment credential vault that maintains the payment credential; and including the payment token in the purchase information;

wherein sending the purchase information includes sending the payment token to the seller.

6. The computer-implemented method of claim 5, further comprising:

determining that the seller is associated with the payment credential vault such that the payment token, when sent to the seller can be used by the seller to process a payment for the at least one distinct item.

7. A non-transitory computer-readable storage medium storing instructions, the instructions when executed by a processor implement a management service that cause the processor to at least:

maintain an image data store storing a plurality of user-supplied images;

receive a request over a network from a user operating a client device to view an image of the plurality of user-supplied images stored within the image data store;

segment the requested image to identify a plurality of image segments within the requested image;

process each of the plurality of image segments to identify a plurality of distinct items represented within the requested image;

match at least one distinct item of the plurality of distinct items represented within the requested image to a corresponding item offered for sale by a seller of a plurality of independent sellers;

provide a presentation of the requested image to the client device of the user over the network, wherein the presentation of the requested image includes seller information associated with the at least one distinct item of the plurality of distinct items represented in the image, wherein seller information identifies the seller of the plurality of independent sellers that sells the at least one distinct item;

receive a request over the network from the client device operated by the user to purchase the at least one distinct item from the seller of the at least one distinct item;

obtain purchase information of the user necessary for the management service to complete a purchase of the at least one distinct item with the seller on behalf of the user as if the request had been received directly by the seller, wherein the seller is independent of the management service;

receive over the network from the seller a purchase confirmation confirming that the purchase of the at least one distinct item has been completed; and send to the client device of the user a notification that the purchase of the at least one distinct item from the seller has been completed.

8. The non-transitory computer-readable storage medium of claim 7, wherein the instructions further cause the processor to at least:

receive from the seller over the network an item catalog indicating a plurality of items available for sale by the seller, wherein the seller also sells each of the plurality of items directly and independent of the management service.

9. The non-transitory computer-readable storage medium of claim 8, wherein the instructions further cause the processor to at least:

receive periodic updates to the item catalog from the seller over the network such that an inventory count for each of the plurality of items is current.

10. The non-transitory computer-readable storage medium of claim 7, wherein the instructions further cause the processor to at least:

in response to receiving the request from the user to purchase the at least one distinct item, send a reservation request to the seller over the network to reserve a unit of the at least one distinct item for use in fulfilling the purchase of the at least one distinct item for the user.

11. The non-transitory computer-readable storage medium of claim 7, wherein the instructions further cause the processor to at least:

in response to receiving the request from the user to purchase the at least one distinct item, obtain over the network from the seller item variant information corresponding to the at least one distinct item.

12. The non-transitory computer-readable storage medium of claim 11, wherein the item variant information is periodically received from the seller over the network and maintained by the management service.

13. The non-transitory computer-readable storage medium of claim 7, wherein the instructions further cause the processor to at least:

receive from the seller over the network an item catalog that includes item information for each of a plurality of items to be offered for sale by the seller to the user through the management service, wherein for each of the plurality of items, the item is also offered for sale by the seller directly and independent of the management service, and the item information includes at least one of the image representative of the item, a source location identifier associated with the item, or item variant information; and store the item catalog in an item catalog data store maintained by the management service.

14. The non-transitory computer-readable storage medium of claim 7, wherein the instructions further cause the processor to at least:

process, with the one or more image processing algorithms, the plurality of user-supplied images maintained in the image data store maintained by the management service; and for each of the plurality of images:

determine a feature vector representative of an item represented in the image;

compare the feature vector with stored feature vectors maintained in an item catalog data store;

determine, based at least in part on the comparison, the item and a seller of the item; and associate the image with the item and the seller of the item.

15. The non-transitory computer-readable storage medium of claim 7, wherein the instructions further cause the processor to at least:

include a purchase control for the at least one distinct item of a plurality of items represented in the requested image in the presentation of the requested image to the user, wherein the purchase control is selectable by the user to initiate the request to purchase the at least one distinct item from the seller.

16. A computing system that, in execution, implements a management service, the computing system comprising:

one or more processors; and a memory coupled to the one or more processors and storing program instructions that when executed by the one or more processors cause the one or more processors to:
   maintain an image data store storing a plurality of user-supplied images;
   receive from one or more sellers over a network item information for plural items offered for sale by a seller through the management service, where each item is also offered for sale directly by a corresponding seller and independent of the management service;
   store the item information for the plural items in an item catalog data store maintained by the management service;
   receive a request over a network from a first user operating a client device to view an image of the plurality of user-supplied images stored within the image data store, wherein the requested image includes a representation of a plurality of items offered for sale by one or more sellers, and where the requested image was supplied to the image data store by a second user;
   segment the requested image to identify a plurality of image segments of the requested image;
   process each of the plurality of image segments to match the item of an image segment to an item offered by sale of the one or more sellers;
   provide a presentation of the requested image to the client device of the first user over the network, the presentation including the item information corresponding to each of the items represented in the requested image;
   receive a request over the network from the client device of the first user to purchase the item represented in the requested image;
   obtain purchase information corresponding to the first user and the item;
   send the purchase information to the seller over the network so that the seller can complete a purchase of the item for the first user as if the request had been received directly by the seller;
   receive over the network from the seller a purchase confirmation confirming that the purchase of the item to the first user has been completed; and
   send over the network to the client device of the first user a notification that the purchase of the item from the seller has been completed.

17. The computing system of claim 16, wherein the one or more processors further maintain item information for a plurality of items offered for sale by a plurality of sellers that are independent of the management service.

18. The computing system of claim 16, wherein the one or more processors further:
   receive from the seller, over the network, item variant information, wherein the item variant information identifies at least one of a price for the item, a size of the item, or a color of the item.

19. The computing system of claim 16, wherein:
   the request to purchase the item includes an indication of a payment credential to be used to process a payment for the item;
   the purchase information is sent to the seller over the network via a payment credential vault that maintains payment credentials; and
   the purchase information includes a unique payment token that was provided by the payment credential vault as representative of the payment credential.

20. The computing system of claim 16,
   wherein the request to purchase the item includes an indication of a payment credential to be used to process a payment for the item; and
   wherein the one or more processors:
      determine a payment token representative of the payment credential;
      include the payment token in the purchase information;
      wherein sending the purchase information includes sending the payment token to the seller over the network.

* * * * *